(12) United States Patent
McKibben et al.

(10) Patent No.: US 9,339,048 B2
(45) Date of Patent: May 17, 2016

(54) METHOD OF MAKING AN EDIBLE CHOCOLATE CONFECTIONERY

(71) Applicants: Anne-Christine McKibben, Sonoma, CA (US); Jeffrey L McKibben, Sonoma, CA (US)

(72) Inventors: Anne-Christine McKibben, Sonoma, CA (US); Jeffrey L McKibben, Sonoma, CA (US)

( * ) Notice: Subject to any disclaimer, the term of this patent is extended or adjusted under 35 U.S.C. 154(b) by 1 day.

(21) Appl. No.: 13/793,979

(22) Filed: Mar. 11, 2013

(65) Prior Publication Data

US 2013/0251856 A1    Sep. 26, 2013

Related U.S. Application Data

(60) Provisional application No. 61/754,024, filed on Jan. 18, 2013, provisional application No. 61/609,896, filed on Mar. 12, 2012.

(51) Int. Cl.
| | |
|---|---|
| *A23G 1/54* | (2006.01) |
| *A23G 1/00* | (2006.01) |
| *A23G 1/20* | (2006.01) |

(52) U.S. Cl.
CPC ............... *A23G 1/54* (2013.01); *A23G 1/0056* (2013.01); *A23G 1/0066* (2013.01); *A23G 1/205* (2013.01); *A23G 1/545* (2013.01)

(58) Field of Classification Search
USPC .................................................. 426/93, 660
See application file for complete search history.

(56) References Cited

U.S. PATENT DOCUMENTS

| | | | |
|---|---|---|---|
| 3,724,984 | A | 4/1973 | Jernigan |
| 4,946,696 | A | 8/1990 | Nendl et al. |
| 6,039,554 | A | 3/2000 | Akutagawa |
| 6,283,742 | B1 | 9/2001 | Akutagawa |
| 6,383,539 | B1 | 5/2002 | Akutagawa |
| 6,485,771 | B1 | 11/2002 | Somerville et al. |
| 6,509,048 | B2 | 1/2003 | Akutagawa |
| 6,660,317 | B1 | 12/2003 | Akutagawa |
| 6,759,079 | B2 | 7/2004 | Klug et al. |
| 6,805,889 | B1 | 10/2004 | Jury |
| 6,878,324 | B2 | 4/2005 | Akutagawa |
| 7,811,621 | B2 | 10/2010 | Jury |
| 7,891,312 | B2 | 2/2011 | Clarke et al. |
| 2003/0077362 | A1 | 4/2003 | Panhorst et al. |
| 2010/0178352 | A1 | 7/2010 | Harpaz |
| 2012/0003359 | A1* | 1/2012 | Walker et al. ................... 426/93 |
| 2012/0064200 | A1* | 3/2012 | Lochet et al. ................ 426/103 |

FOREIGN PATENT DOCUMENTS

| | | |
|---|---|---|
| WO | WO 2004/034799 A2 | 4/2004 |
| WO | WO 2007/067097 A2 | 6/2007 |

* cited by examiner

*Primary Examiner* — Lien T Tran
(74) *Attorney, Agent, or Firm* — Powley & Gibson, P.C.; Robert L. Powley; Fritz Klantschi

(57) ABSTRACT

A chocolate confectionery and a method for manufacturing same chocolate confectionery where the chocolate confectionery has multiple pearls of flavor distributed evenly throughout a base chocolate wafer such that the flavor and consistency of the chocolate confectionery is consistent throughout. In one form of the chocolate confectionery, small pearls of flavor are suspended within the chocolate creating a pleasing flavor balance and mouth feel with overall lower sugar content and higher cocoa content.

17 Claims, 53 Drawing Sheets

DIA 36.0mm
10/20
7.9mm
7.9mm
11/21
7.9mm
7.9mm
7.9mm
3.0mm
2.6mm
2.6mm
3.5mm
7.9mm
7.9mm
12/22

10/20

10/20

METHOD OF MAKING AN EDIBLE CHOCOLATE CONFECTIONERY

CROSS REFERENCE TO RELATED APPLICATIONS

This application claims priority from U.S. Provisional Application No. 61/609,896 filed on Mar. 12, 2012 and U.S. Provisional Application No. 61/754,024 filed on Jan. 18, 2013.

FIELD OF THE INVENTION

The present invention generally relates to chocolate confectionery and more particularly to an edible chocolate wafer that has deposits of filling distributed evenly about the wafer.

BACKGROUND OF THE INVENTION

Chocolate confectionery includes those confections where chocolate is used as a coating for various fruits and fillings such as cherries. Traditional filled confections have a single, large cell of filling material that is either covered in enrobing chocolate or deposited into a molded chocolate form which is then "topped" with enrobing chocolate. The structural designs of these traditional products have a significantly low Chocolate to Filling Ratio. Also, in traditional filled confections, the sugar content of the filling material is typically higher than the sugar content of the chocolate.

The current industry method of producing a chocolate confectionery, such as a chocolate truffle is to use a standard single shot deposition method. Current usage pairs a single jacketed tube with a single mold cavity to create a filled confection with one large filling "center" (e.g. chocolate truffle).

FIG. 1 depicts an isometric view with transparent surfaces of a jacketed tube with plates separated, while FIG. 2 is an isometric segmented view of a jacketed tube with plates separated. In a standard single shot deposition, both chocolate 1 and filling 2 are introduced simultaneously to separate inputs in a two piece deposition plate that comprises a "jacketed tube" nozzle (See FIGS. 1 and 2). As illustrated, the chocolate passes through an opening 53 in the top plate 51 to the bottom plate 52 below. The filling 2 is guided through a first channel 54 in the top plate down into a small diameter tube 55. As the chocolate reaches the bottom plate 52, it is guided through a second channel 56 down to a large diameter opening, jacket 57.

When the two plates 51, 52 are assembled in place (FIGS. 3 and 4), the narrow tube 55 from the top plate 51 projects down through the larger jacket 57 in the bottom plate 52. During deposition, the filling 2 extruded through the tube 55 is completely surrounded by the chocolate 1 extruded through the jacket 57. One application of this technique involves the deposition of both filling 2 and chocolate 1 through a single jacketed tube into a single mold cavity to create a molded, filled chocolate truffle.

The ratio of chocolate to filling can be controlled by varying the pressure exerted on the respective inputs of each ingredient. Typically, the truffles produced in this method have a low Chocolate to Filling Ratio and thus have a relatively high sugar content. Additionally, the high sugar filling of a traditional confectionary is located in the center, thus concentrating the flavor in one area of the confection.

Considerations in making chocolate confectionery are Chocolate to Filling Ratio vs. Product Esthetics, Chocolate to Filling Ratio vs. Sugar Content, Consumer Attractiveness (Negative Health Impact of Sugar, Positive Health Impact of Chocolate), and Product Structure.

Chocolate to Filling Ratio vs. Product Esthetics.

The chocolate and filling components of a filled chocolate confection can have significant differences in flavor characteristics and structural consistency. The Chocolate to Filling Ratio is one important consideration in determining the flavor balance and mouth feel of the finished product.

Chocolate to Filling Ratio vs. Sugar Content.

As mentioned, in traditional filled confections, the sugar content of the filling material is typically higher than the sugar content of the chocolate. A product with a relatively higher Chocolate to Filling Ratio will typically result in relatively lower sugar content.

Consumer Attractiveness:

Negative Health Impact of Sugar.

Despite the pleasing flavor attribute of sweetness, diets that are high in sugar have been linked to negative health impacts including dental decay, obesity and metabolic diseases including diabetes. Products which retain sweet flavor with reduced sugar content can be more attractive to many consumers.

Positive Health Impact of Chocolate.

Cocoa, a fundamental ingredient in chocolate confections, contains antioxidants which have been linked to numerous health benefits. Chocolate confections with relatively high cocoa content can be attractive to many consumers.

SUMMARY OF THE INVENTION

The foregoing and other problems and deficiencies in known chocolate confectionery are solved and a technical advantage is achieved by an edible chocolate wafer that distributes the filling throughout the wafer and has a high chocolate to filling ratio. That is, the structure of the edible chocolate wafer distributes the flavored filling among multiple wells or pearls of flavor throughout the volume of the confectionery, allowing a pleasing flavor balance and mouth feel with overall lower sugar content and higher cocoa content. Creating a filled confection with several flavor deposits that have health, esthetic and structural benefits.

In accordance with an aspect of the present invention, there is provided an edible chocolate confectionery comprising a chocolate wafer having dimensions and one or more depressions formed on a top surface of the chocolate wafer, more than one flavored fillings embedded in the one or more depressions, and an enrobing layer of chocolate. The chocolate wafer may be made from one of white, milk or dark chocolate, while the flavored filling is either a chocolate-based filling or a sugar-based filling. The sugar-based filling includes syrups and caramel. The more than one flavored fillings are in a hemispherical shape and are distributed throughout the chocolate wafer.

In another embodiment, the edible chocolate confectionery comprises chocolate, and more than one flavored fillings. The more than one flavored fillings are suspended within the chocolate, and are in the shape of orbs, distributed symmetrically about the chocolate.

Another embodiment is a method of making an edible chocolate confectionery includes the steps of heating chocolate and a flavored filling such that both are in a liquefied phase, depositing the chocolate and flavored filling into a multi-nozzle jacketed tube assembly. The flavored filling may be in a liquid or semi-liquid phase already and would not to be heated. The combined chocolate and flavored filling is deposited into a single cavity mold, and is cooled until the chocolate is in a solid phase and the flavored filling may be in a liquid, semi-liquid or solid phase. The tempered chocolate first enters the multi-nozzle jacketed tube assembly and the single cavity mold. Liquefied flavored filling is subsequently and simultaneously with the tempered chocolate deposited into the multi-nozzle jacketed tube assembly whereby as the flavored filling exits the multi-nozzle jacketed tube assembly it is surrounded by the tempered chocolate. Flow of the liquefied flavored fillings is terminated prior to the termination of the chocolate flow such that pearls of flavor are formed within the tempered chocolate, and the tempered chocolate continues to flow until the single cavity mold is completely filled. Chocolate used may be one of white, milk or dark chocolate, and the flavored filling is either a chocolate-based filling or a sugar-based filling. Sugar-based filling includes syrups and caramel. The more than one pearls of flavor are distributed throughout the chocolate wafer.

BRIEF DESCRIPTION OF THE DRAWINGS

The foregoing summary, as well as the following detailed description of the invention will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein.

FIG. 46: Small Three Stage Basic Product, Isometric View with Section View of Enrobing and Filling;

FIG. 47: Small Basic Molded Chocolate Wafer, Plan View;

DETAILED DESCRIPTION

The present subject matter will now be described more fully hereinafter with reference to the accompanying figures, in which representative embodiments are shown. The present subject matter can, however, be embodied in different forms and should not be construed as limited to the embodiments set forth herein. Rather, these embodiments are provided to describe and enable one of skill in the art. Unless otherwise defined, all technical and scientific terms used herein have the same meaning as commonly understood by one of ordinary skill in the art to which the subject matter pertains. All publications, patent applications, patents, and other references mentioned herein are incorporated by reference in their entirety.

While reference herein is made to an edible chocolate wafer, it is to be understood that the present invention has application in any chocolate confectionery or other food products including such items as crackers, biscuits, cakes and cookies with inclusions of cheese, sweet fillings (e.g. chocolate or sugar-based) or savory fillings (e.g. mushroom paste) or spicy fillings (e.g. wasabi).

Described herein are various embodiments of a chocolate filled confection (e.g., a chocolate confection) that may be configured to achieve a variety of flavor balances, mouth feels, sugar contents, and cocoa contents not available with traditional confection manufacture. Included herein are descriptions of processes for simultaneous deposition of chocolate and filling, filling deposition, and mold creation.

It is also contemplated that one or more of the disclosed processes may be used to create other types of products such as biscuits or crackers having inclusions of cheese. In addition to cheese, sweet fillings (e.g. chocolate or sugar-based) or savory fillings (e.g. mushroom paste) or spicy fillings (e.g. wasabi) may be used as inclusions in biscuits, crackers, cakes or cookies. In addition to the Three Stage Basic Process (discussed later), these food products may be produced by the modified Single Shot Process (described later).

The base product is, in some embodiments, a chocolate wafer that includes multiple deposits of flavored filling also known as inclusions or pearls of flavor distributed throughout the wafer in a geometric grid. Inclusions as known in the industry may refer to solid, semi-liquid or liquid substances. In the context of the embodiments described herein referring to the processes described, inclusions refer generally to semi-liquid or liquid substances. In certain embodiments, the inclusions may be in a solid phase. A variety of distinct manufacturing processes can be used to produce this filled chocolate wafer. Described herein are two such processes: Modified Single Shot Deposition and Three Stage Deposition.

Single Shot Basic Product

Figure 1:
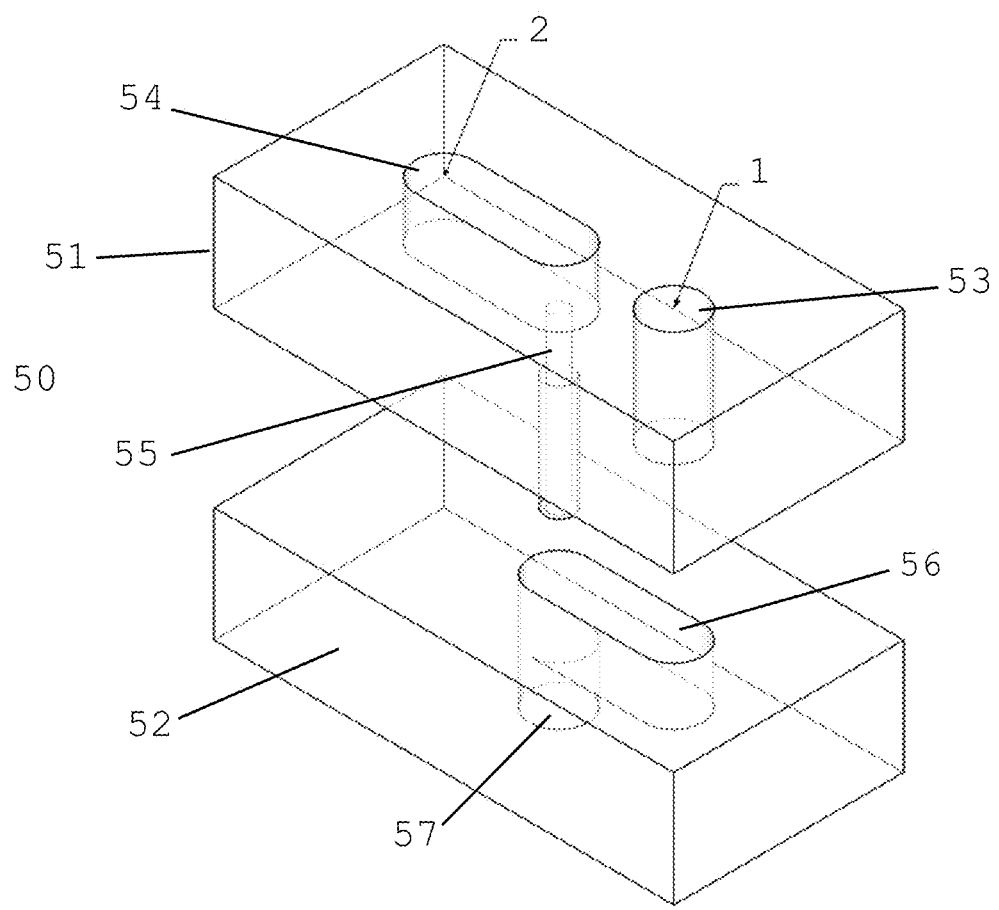
FIG. 1: Example Jacketed Tube with Plates Separated, Isometric View with Transparent Surfaces.
Figure 2:
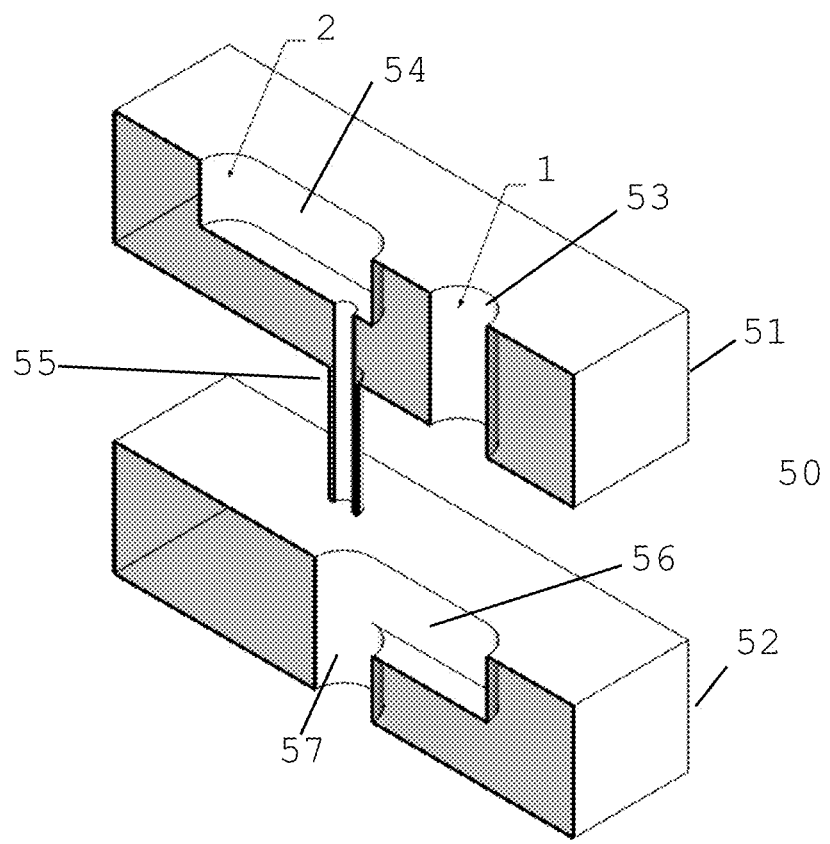
FIG. 2: Example Jacketed Tube with Pieces Separated, Isometric Section View.
Figure 3:
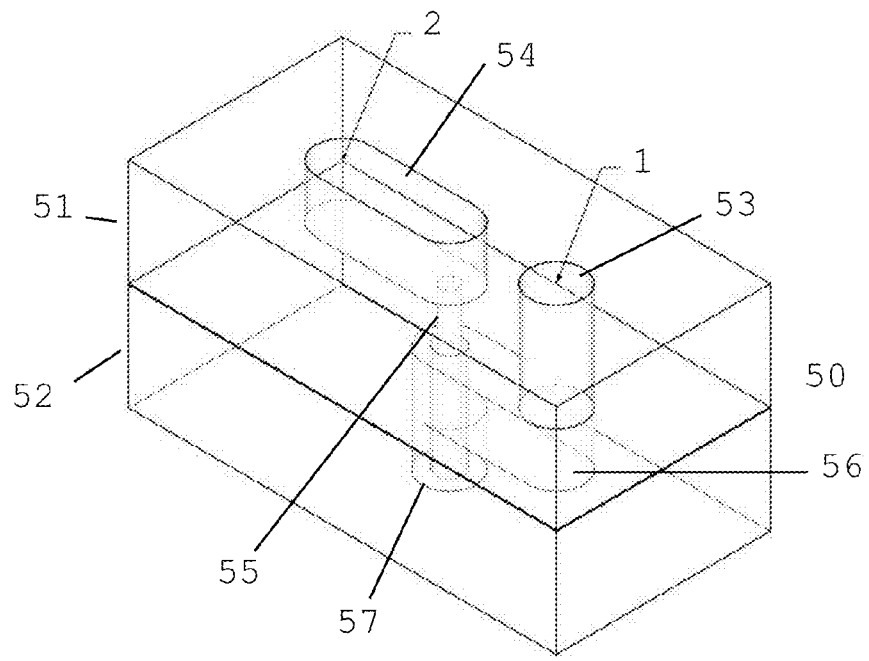
FIG. 3: Example Jacketed Tube with Plates in Place, Isometric View with Transparent Surfaces.
Figure 4:
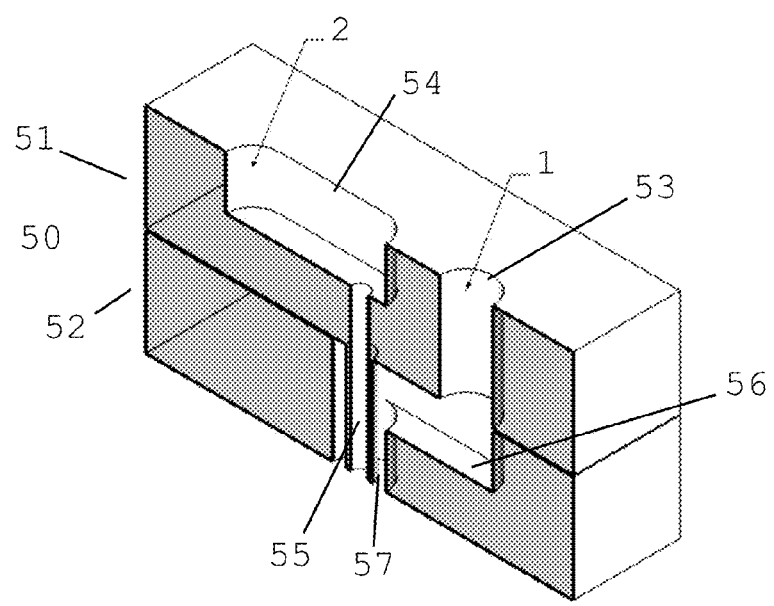
FIG. 4: Example Jacketed Tube with Plates in Place, Isometric Section View.
Figure 5:
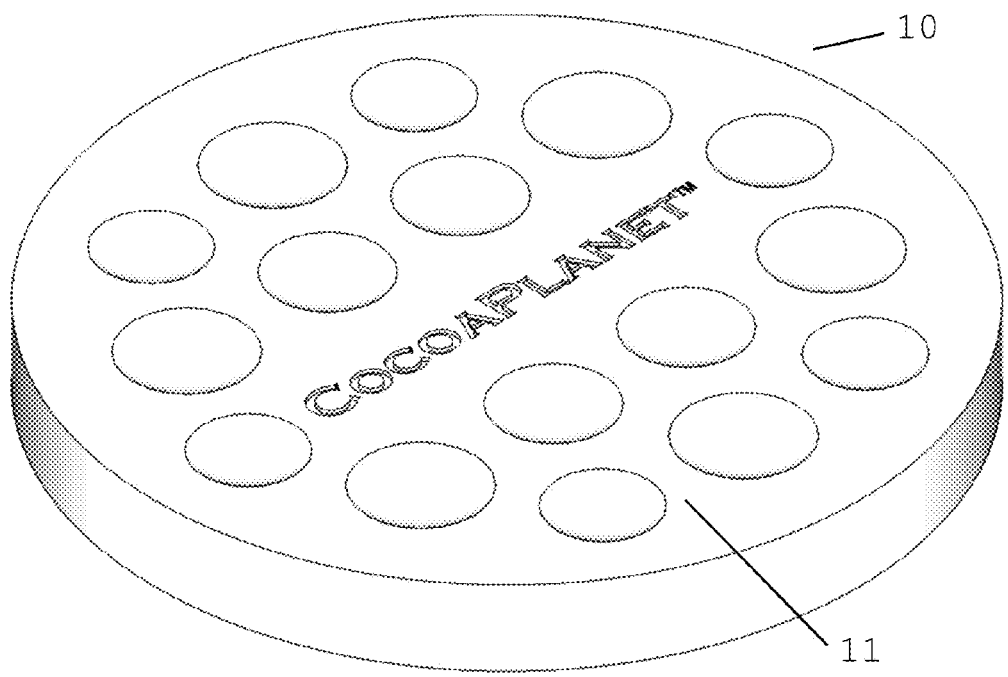
FIG. 5: Single Shot Basic Product, Isometric View.
Figure 6:
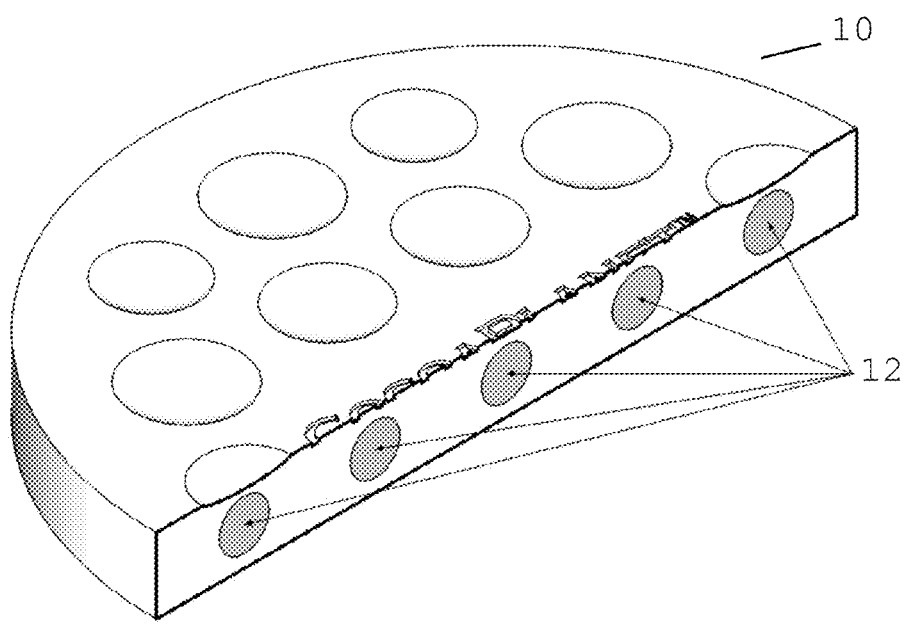
FIG. 6: Single Shot Basic Product, Isometric Section View.

FIGS. 5 and 6 depict a single shot basic product 10. The single shot basic product 10 is a molded chocolate wafer 11 containing several small orbs of flavored substances, also referred to as pearls of flavor 12. Multiple small orbs of flavored substances are distributed throughout the wafer allowing for a consistent flavor experience when consuming the wafer, not a highly concentrated flavor at the center as with a traditional chocolate confectionery. Furthermore, the chocolate to filling ratio is also variable, allowing for a higher chocolate content, thus reducing the level of sugar as compared to a traditional chocolate confectionary. In both the Modified Single Shot Basic Product and the Three Stage Basic Product (described later) the reduced sugar amount is due to less filling substance compared to the quantity of chocolate. That is, the Modified Single Shot Basic Product and the Three Stage Basic Product have an 85:15 chocolate to filling ratio as compared to traditional confections which have 20:80 chocolate to filling ratio. As a result, traditional confections have a calculated 7.5% more sugar content than either the Modified Single Shot Basic Product or the Three Stage Basic Product. This assumes that the traditional confections use the same chocolate and filling as the Modified Single Shot Basic Product or the Three Stage Basic Product. In actuality, traditional confections use chocolates and fillings with higher sugar content than that used by the disclosed invention, thereby increasing the difference in overall sugar content as compared to the Modified Single Shot Basic Products or the Three Stage Basic.

The molded chocolate wafer 11 may be made from a variety of chocolates, such as milk chocolate, dark chocolate, white chocolate, and any combination thereof. The physical characteristics of the molded chocolate wafer, size, shape, etc. are similar to those of the shaped molded chocolate wafer 21 of the three stage basic product 20, described below. Examples of the flavored substance used in the pearls of flavor 12 include but are not limited to chocolate-based fillings and sugar-based fillings (including syrups and caramels). Both the chocolate-based and sugar-based fillings may contain one or more of salted caramel, vanilla espresso, chocolate olive, mandarin orange, and cocoamint (peppermint). Other substances for the fillings are contemplated. Variations in the viscosity of flavored substances also known as filling material used to produce the small pearls of flavor 12 can be used to tailor the mouth feel. The process for manufacturing a single shot basic product 10 is a modified single shot deposition process using a multi-nozzle jacketed tube assembly 30 combined with a single cavity mold which is described later.

The dimensions of the single shot basic product 10 are generally the same as those described for the three stage basic product. As with the three stage basic product, it is anticipated that the dimensions of the single shot basic product 10 may vary in size, depending on multiple reasons such as but not limited to, customer preference.

The diameter of the pearls of flavor is a function of the volume of filling material deposited. There are a number of factors that influence the volume of filling, including tube diameter, but also pressure of extrusion which is controlled by the (adjustable) length of retraction in the pistons that drive extrusion in the depositing machine. Another factor influencing diameter is whether the pearl of flavor maintains a perfectly spherical form or whether it flattens into an ovoid with a horizontal diameter that is greater than the vertical diameter. This is influenced by the presence of the tempered chocolate, which serves to limit the "flattening" or horizontal expansion. Typically, the diameter of a pearl of flavor has a range of 1/16 to 1/4 inch.

Three Stage Basic Product

Figure 7:
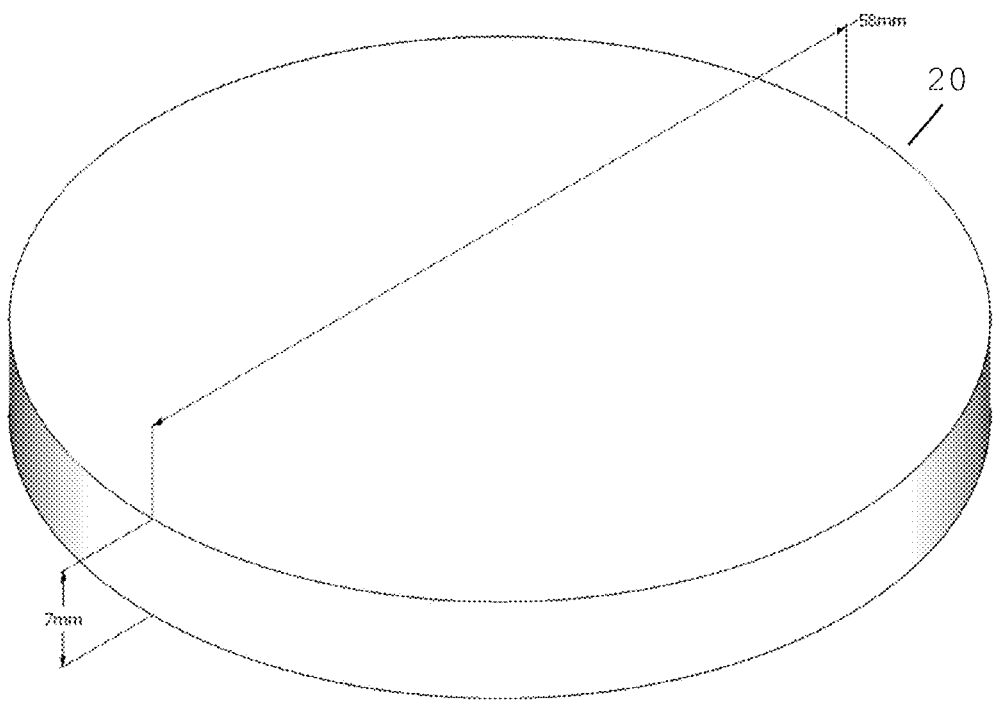
FIG. 7: Three Stage Basic Product, Isometric View.
Figure 8:
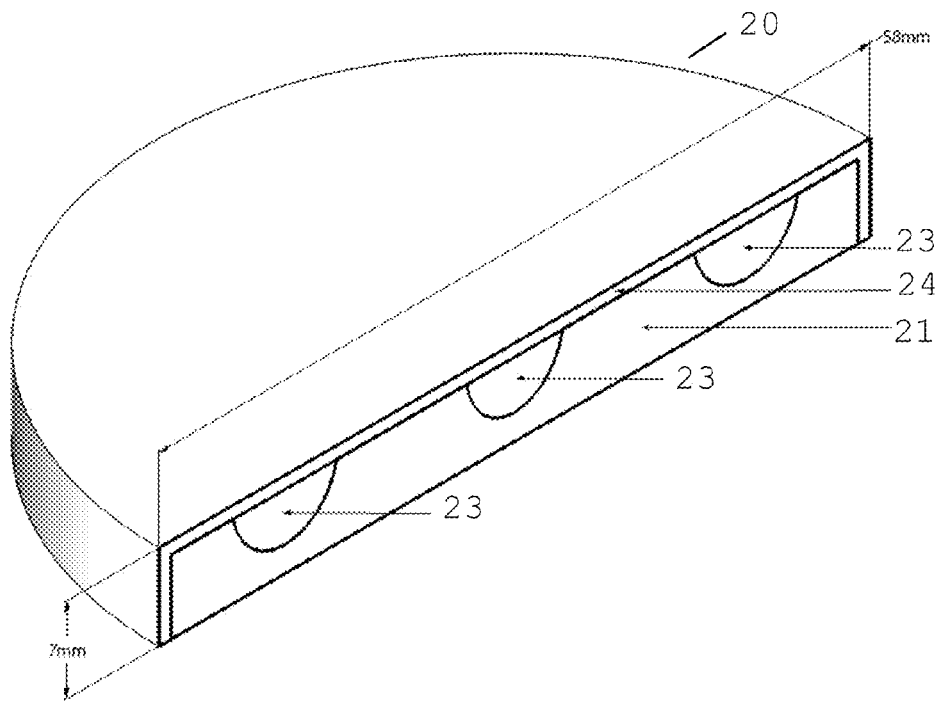
FIG. 8: Three Stage Basic Product, Isometric Section View.

FIGS. 7 and 8 depict a three stage basic product 20. The three stage basic product 20 is a disc-shaped molded chocolate wafer 21 with several depressions (wells) 22 on the top surface 25, each of which is filled with a flavored substance 23. The filled wafer can optionally be covered with enrobing chocolate 24. The outer dimensions of the three stage basic product 20 are 7 millimeter (mm) in height and a diameter of 58 mm.

Following is a description of components included in the three stage basic product in some embodiments of the product.

Molded Chocolate Wafer. The chocolate wafer 21 is a molded form. On the top surface 25 are arranged several depressions 22 (also referred to herein as "wells" and "cells"). The wafer 21 is in the shape of a disc having a height of 6 mm and a diameter of 56 mm. It has a weight of 20 grams. These dimensions and measurements are exemplary and it is anticipated that different size wafers may be used. The wafer may be made out of dark chocolate (64% cacao), white chocolate, milk chocolate or any variation thereof. Dark chocolate with a different percentage of cacao is also anticipated to be used in the manufacture of both the three stage basic product and the single shot basic product.

Figure 9:
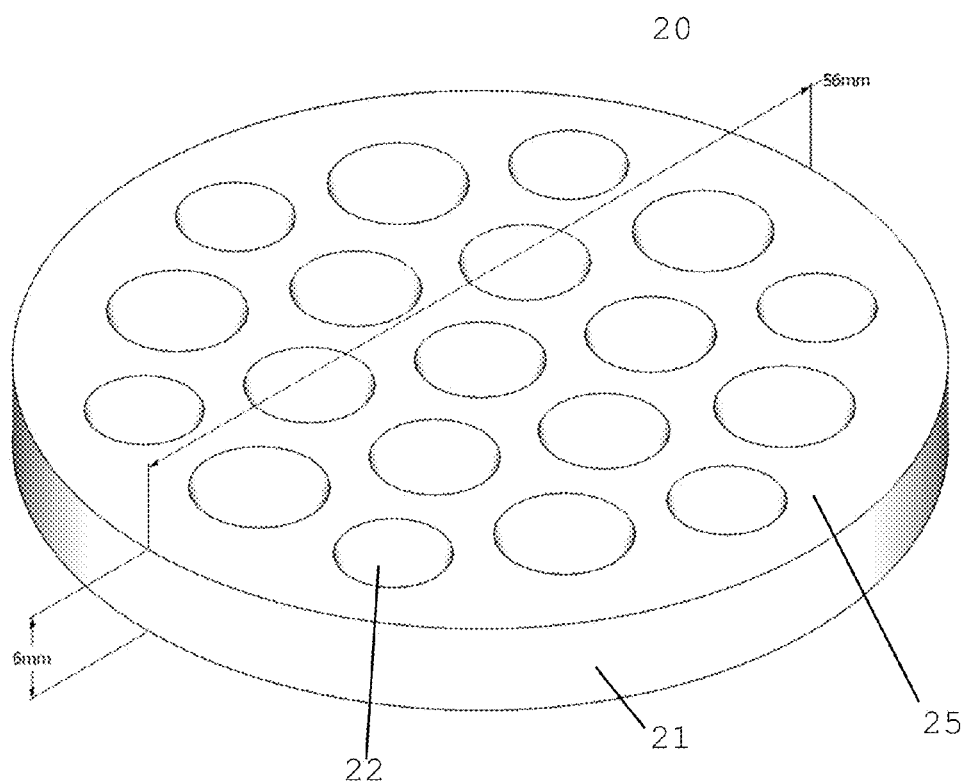
FIG. 9: Basic Molded Chocolate Wafer, Isometric View.
Figure 10:
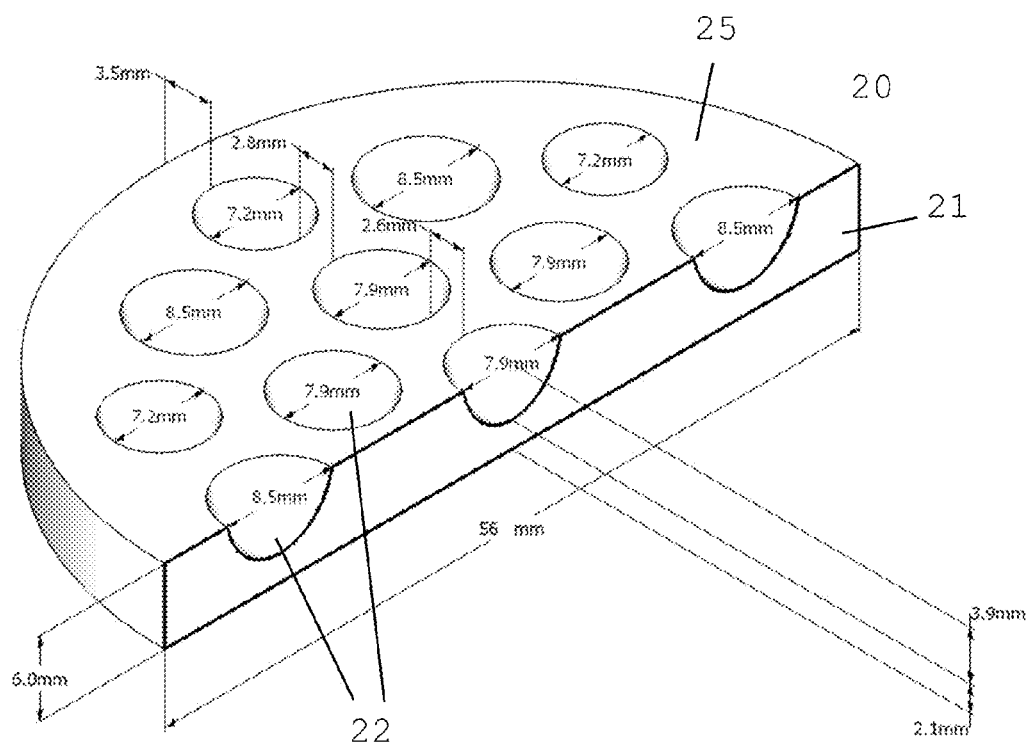
FIG. 10: Basic Molded Chocolate Wafer, Isometric Section View.

FIGS. 9 and 10 depict an embodiment of the present invention featuring a circular wafer plan shape with 19 hemispheric wells 22 arranged in a hexagonal matrix (tiling pattern) on the top surface 25. Several aspects of this basic molded chocolate wafer design can be varied, including wafer size, wafer plan shape, well size, well shape, density and tiling patterns, as described below.

Figure 11:
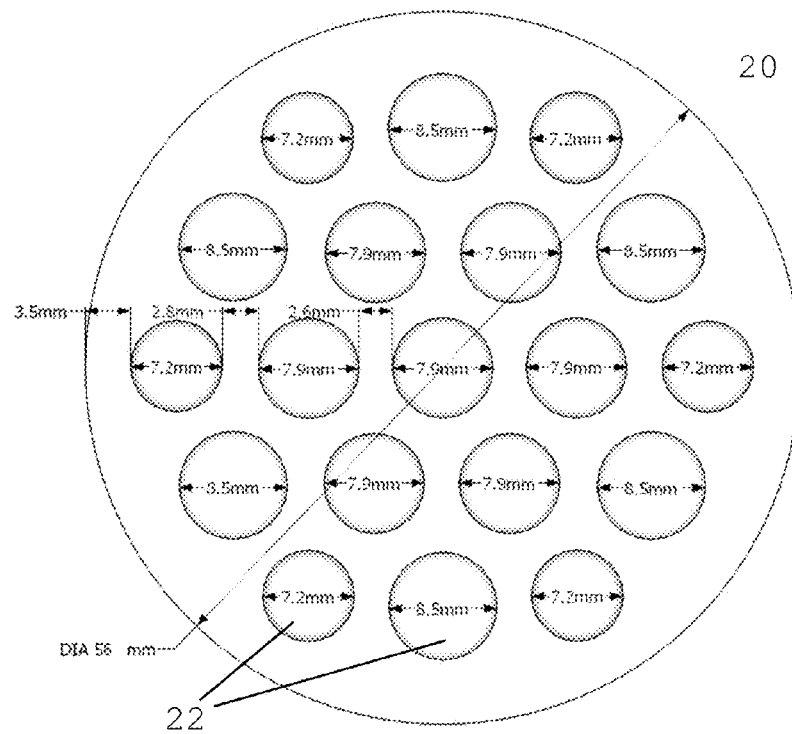
FIG. 11: Basic Molded Chocolate Wafer, Plan View.

FIG. 11 shows a plan view of the basic molded chocolate wafer 21 having a diameter of 56 millimeters (mm). In this example, the diameters of the wells 22 circling the perimeter of the wafer 21 are alternately larger 8.5 mm and smaller 7.2 mm than the diameter of the wells 22 in the center of the pattern 7.9 mm. The outer diameter wells 22 on the perimeter of the wafer are set 3.5 mm in the outer perimeter. Whereas, the distance between the wells of the outer perimeter and the inner wells is 2.8 mm and the distance between the wells having a 7.9 mm diameter is 2.6 mm. This variation in diameter allows the wells 22 in the hexagonal tiling pattern to be more evenly distributed within, and to be a more complete cover of, the circular perimeter of the wafer 21. In some embodiments, the wells 22 are all of uniform size. The depth of the wells 22 may be 3.9 mm.

Figure 12:
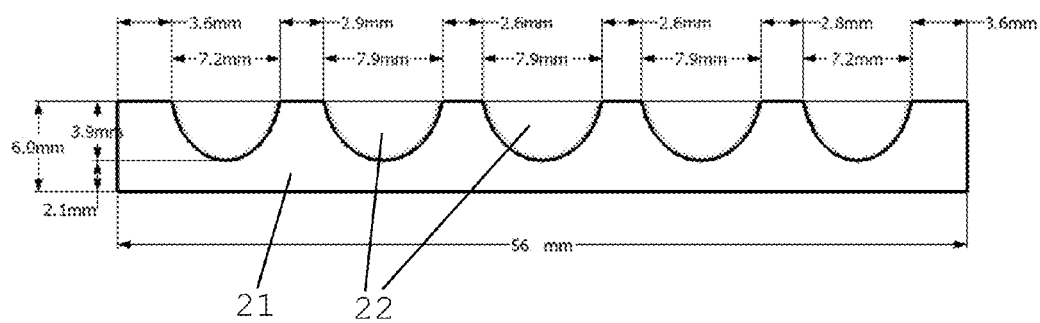
FIG. 12: Basic Molded Chocolate Wafer, Section View.

FIG. 12 shows a section view of the wafer 21, including a hemispherical shape of the wells 22. Other shapes can also be used, as applicable.

In some embodiments, the wells 22 in the wafer 21 are filled with a flavored substance through a deposition process. This allows the introduction of a variety of flavors that will be complimentary to the chocolate. Example filling materials for both the sugar-based fillings and the chocolate-based fillings include, but are not limited to, salted caramel, vanilla espresso, chocolate olive, mandarin orange and cocoamint (peppermint). Variations in the viscosity of filling material 23 can be used to tailor the mouth feel and deposition efficiency or to facilitate the distribution of filling 23 among the wafer's multiple wells 22, or for other purposes.

The filled wafer may be covered on the top and sides with an outer shell of chocolate 24 (also referred to herein as "Enrobing Chocolate"). The enrobing chocolate may have a thickness of 1 mm. Other thicknesses are contemplated. Typically, the enrobing chocolate will be the same as the chocolate used to manufacture the wafer, for example milk, dark or white chocolate. However, it is contemplated that the chocolate used for the enrobing chocolate may be different than that of the chocolate wafer. Optionally, the enrobing chocolate 24 may be omitted. The decision to include or omit enrobing chocolate 24 may be driven by a variety of factors, such as esthetic considerations including appearance and mouth feel. Inclusion of enrobing chocolate 24 can also be used to structurally contain the filling material 23, such as in the case of more viscous filling materials.

Figure 13:
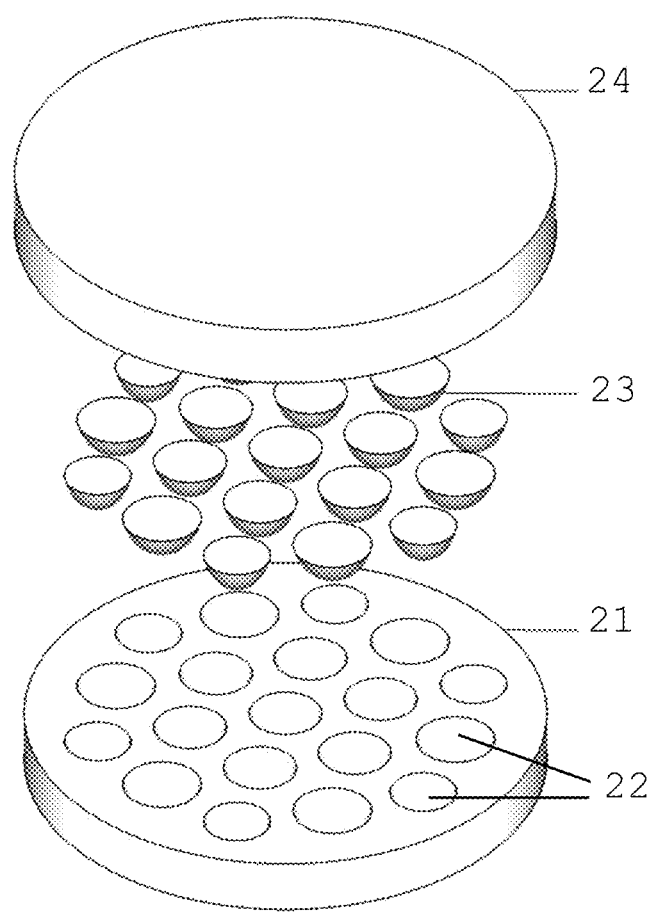
FIG. 13: Three Stage Basic Product, Exploded Isometric View.
Figure 14:
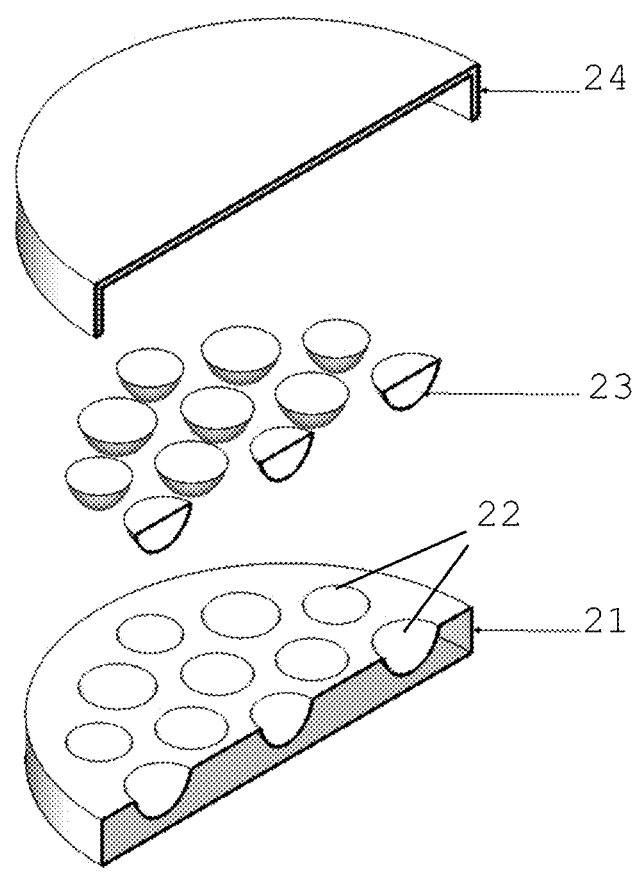
FIG. 14: Three Stage Basic Product, Exploded Isometric Section View.

FIGS. 13 and 14 depict the components of the three stage basic product in exploded views.

As discussed, various factors can be modified to alter the taste, caloric, and health impact of the filed chocolate wafer. One such factor is the Chocolate to Filling Ratio (CFR). The ratio of total chocolate (i.e., wafer 21 plus enrobing 24) to filling material 23 is one consideration in the design of a filled chocolate confection. Table 1 details an example calculation of the Chocolate to Filling Ratio (CFR) in terms of volume for the three stage basic product described above. The data presented in Table 1 is exemplary and other values may be substituted.

TABLE 1

Example Calculation of Chocolate to Filling Ratio by Volume for Three Stage Basic Product

|  | Standard Wells | Larger Wells | Smaller Wells |
|---|---|---|---|
| Filling |  |  |  |
| Well Diameter (cm) | 0.79 | 0.85 | 0.72 |
| Well Radius (cm) | 0.40 | 0.43 | 0.36 |
| Well Volume (cm³) | 0.13 | 0.15 | 0.11 |
| Count of Wells | 7 | 6 | 6 |
| Total Volume (cm³) | 0.90 | 0.90 | 0.64 |
| Filling Volume (cm³) | 2.44 |  |  |
| Chocolate Wafer |  |  |  |
| Filled Wafer Diameter (cm) | 5.61 |  |  |
| Filled Wafer Radius (cm) | 2.80 |  |  |
| Filled Wafer Plan Area (cm²) | 24.70 |  |  |
| Filled Wafer Height (cm) | 0.60 |  |  |
| Filled Wafer Volume (cm³) | 14.82 |  |  |
| Filling Volume (cm³) | (2.44) |  |  |
| Chocolate Wafer Volume (cm³) | 12.38 |  |  |
| Chocolate Enrobing |  |  |  |
| Enrobing Thickness (cm) | 0.05 |  |  |
| Enrobed Wafer Diameter (cm) | 5.71 |  |  |
| Enrobed Wafer Radius (cm) | 2.85 |  |  |
| Enrobed Wafer Plan Area (cm²) | 25.59 |  |  |
| Enrobed Wafer Height (cm) | 0.65 |  |  |
| Enrobed Wafer Volume (cm³) | 16.63 |  |  |

TABLE 1-continued

Example Calculation of Chocolate to Filling
Ratio by Volume for Three Stage Basic Product

|  | Standard Wells | Larger Wells | Smaller Wells |
|---|---|---|---|
| Filled Wafer Volume (cm³) | (14.82) | | |
| Chocolate Enrobing (cm³) | 1.81 | | |
| Chocolate to Filling Ratio | | | |
| Chocolate Wafer Volume(cm³) | 12.38 | | |
| Chocolate Enrobing Volume(cm³) | 1.81 | | |
| Chocolate Volume (cm³) | 14.19 | 85% | |
| Filling Volume (cm³) | 2.44 | 15% | |
| Total Volume (cm³) | 16.63 | 100% | |
| Chocolate to Filling Ratio (by Volume) | 5.81 | | |

Modified Single Shot Production Process

The modified single shot production process used in manufacturing the single shot basic product employs a modified single shot deposition (discussed in the Background of Invention Section) using a unique multi-nozzle jacketed tube assembly 30 combined with a single cavity mold 40. The multi-nozzle jacketed tube assembly 30 consists of two plates, an upper or top plate 31 and lower or bottom plated 32.

The modified single shot deposition technique produces a single shot basic product describe above that is similar to a three stage basic product 20. By arranging several jacketed tubes into the desired tiling pattern, the pearls of flavor 12 can be produced with a single simultaneous shot of both filling substance 2 and chocolate 1.

Figure 15:
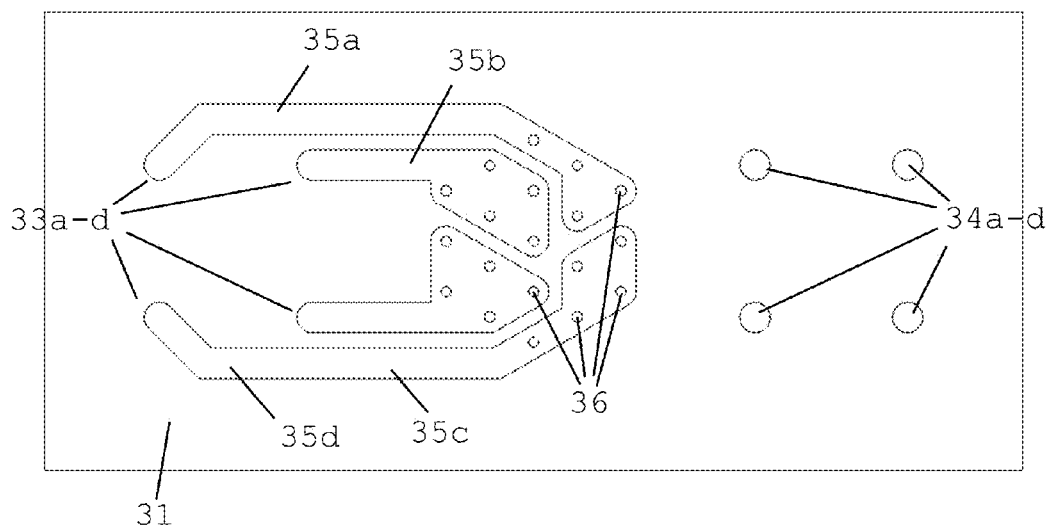
FIG. 15: Multi-Nozzle Jacketed Tube, Top Plate, Plan View.

FIG. 15 depicts a plan view of the top plate 31 of an examplary Multi-Nozzle Jacketed Tube assembly 30 designed to produce the 19 pearls of flavor 12 arranged in a hexagonal tiling pattern similar to the three stage basic product 20 previously described. Plate 31 is used in conjunction with a depositor machine (not shown) and has four circular inputs 33 *a-d*, having a diameter of between ⅛ and ½ inch depending on the particular product dimensions, on the left for the filling substance 2 and four circular inputs 34 *a-d*, having a diameter of between ⅛ and ½ inch depending on the particular product dimensions, on the right for the chocolate 1. The inputs for the tempered chocolate extend through the top plate 31. The filling substance 2 is introduced to each of the inputs 33 *a-d* on the left and flows through channels 35 *a-d* to a chamber where it is distributed among several narrow-diameter outputs (also referred to herein as "tubes") 36. Each channel 35 supports more than one tube 36. The channels 35*a-d* have a width of between ⅛ and ½ inch and a depth of between ⅛ and ½ inch. The length and configuration of the channels 35*a-d* may vary depending on the final product dimension. The tubes 36 have a diameter of between 1/16 and ¼ inch diameter, a wall thickness of between 1/64 and 1/16 inch, and extend through both the top and bottom plates 31 and 32. Chocolate 1 is introduced to each of the inputs 34 *a-d* on the right, and flows down through openings to the bottom plate 32 (see FIG. 16). The flow rate of the filling substance 2 and chocolate 1 can be controlled by the depositor machine through temperature and the viscosity properties of the chocolate 1 and filling substance 2.

Figure 16:
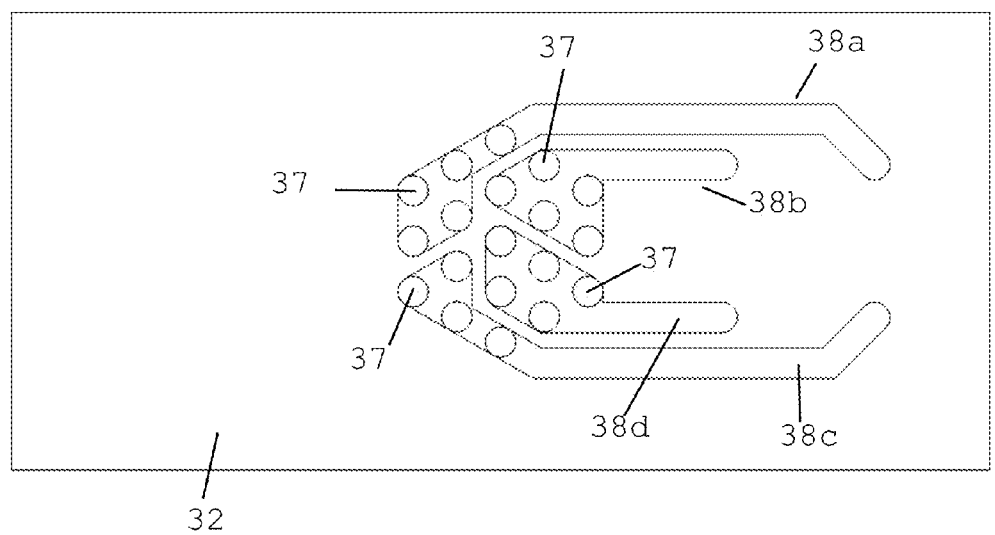
FIG. 16: Multi-Nozzle Jacketed Tube, Bottom Plate, Plan View.

FIG. 16 depicts a plan view of the bottom plate 32 for the Multi-Nozzle Jacketed Tube assembly 30 corresponding to the top plate 31 illustrated in FIG. 15. Tempered chocolate 1 passes through the openings 34 *a-d* in the top plate 31 where it is introduced to each of the inputs on the right and flows through a channel 38 *a-d* to a chamber where it is distributed among several wide-diameter outputs (jackets) 37. The channels 38*a-d* have a width of between ⅛ and ½ inch and a depth of between ⅛ and ½ inch. The length and configuration of the channels 38*a-d* may vary depending on the final product dimension. The jackets 37 have a diameter of between ⅛ and ½ inch and extend through the bottom plate.

Figure 17:
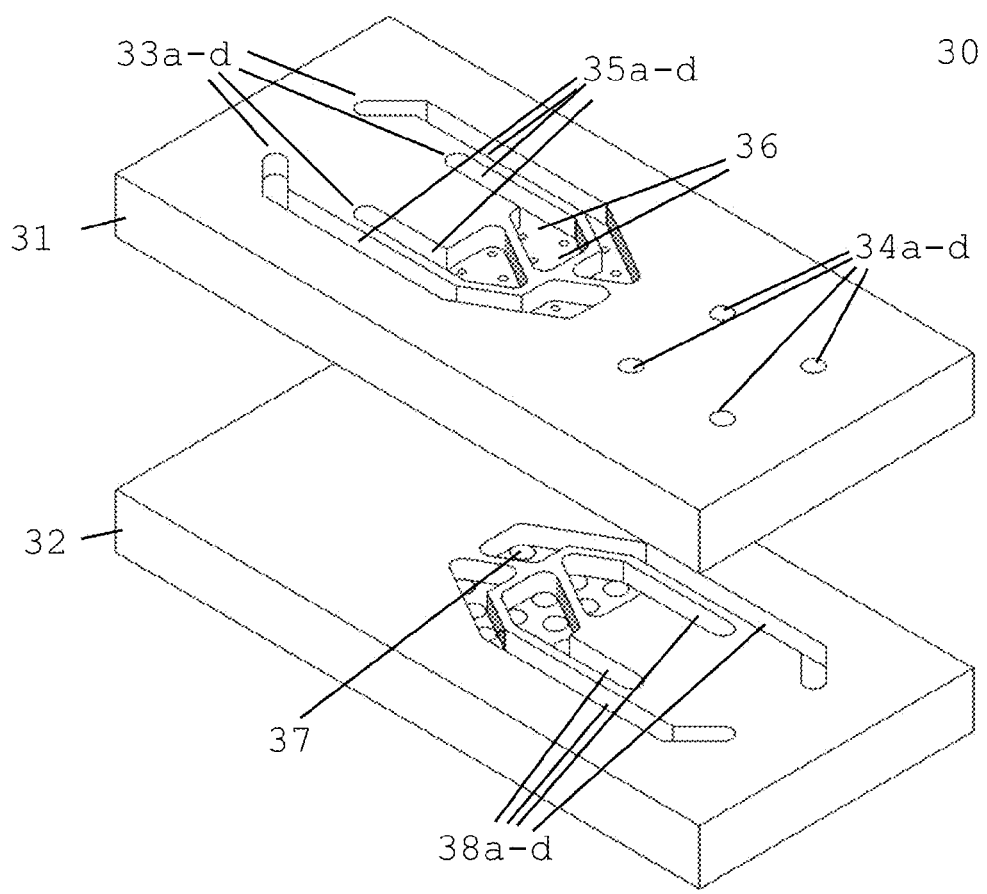
FIG. 17: Multi-Nozzle Jacketed Tube with Plates Separated, Isometric View.
Figure 18:
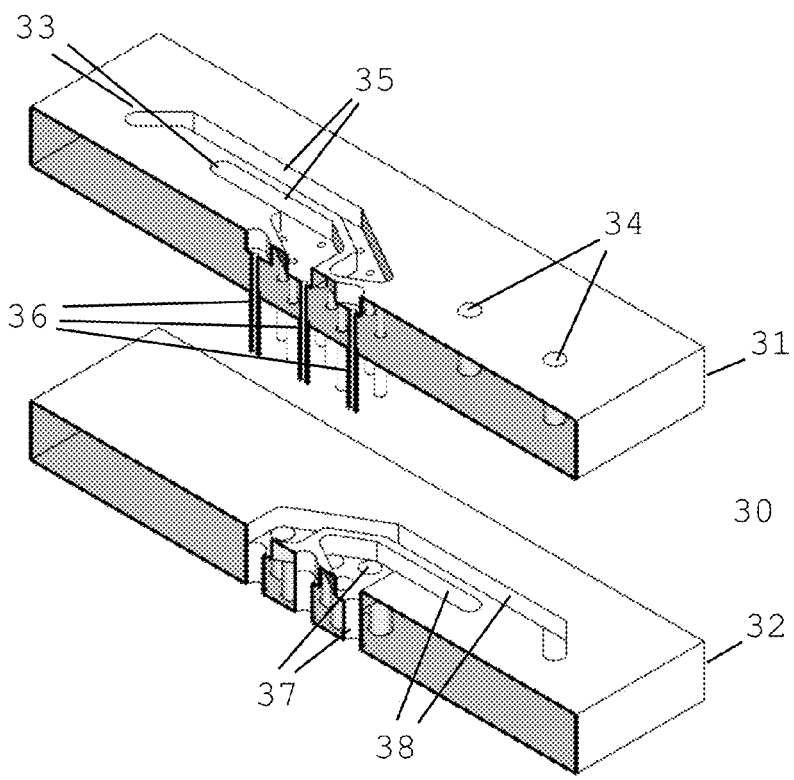
FIG. 18: Multi-Nozzle Jacketed Tube with Plates Separated, Isometric Section View.

FIG. 17 depicts an isometric view of a Multi-Nozzle Jacketed Tube Assembly 30 with plates separated, while FIG. 18 depicts an isometric cross section view of a Multi-Nozzle Jacketed Tube Assembly 30 with plates separated. In the modified single shot deposition process, both chocolate 1 and filling substance 2 are introduced simultaneously to the separate inputs 34 *a-d* and 33 *a-d*, respectively, in the two piece deposition plates 31 and 32 that comprises multiple "jacketed tube" nozzles. The chocolate 1 passes through openings 34 *a-d* in the top plate 31 to the bottom plate 32 below. The filling 2 is guided through first channels 35*a-d* in the top plate 31 down into a small diameter tube 36. As the tempered chocolate 1 reaches the bottom plate 32, it is guided through second channels 38*a-d* down to a large diameter opening, jackets 37.

Figure 19:
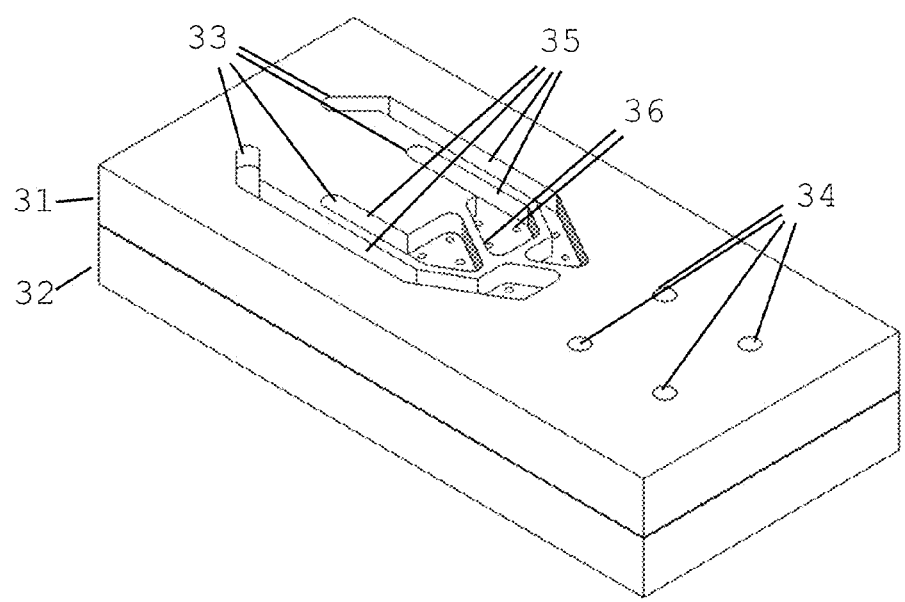
FIG. 19: Multi-Nozzle Jacketed Tube with Plates in Place, Isometric View.
Figure 20:
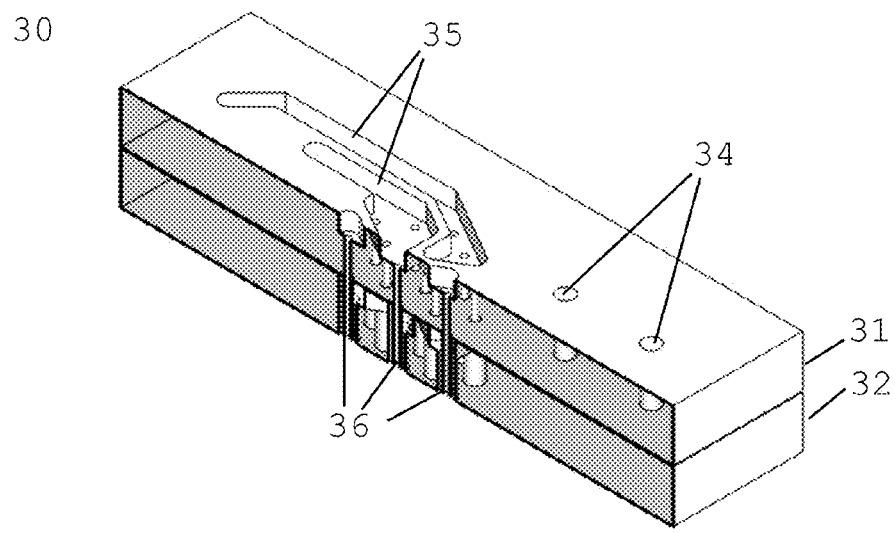
FIG. 20: Multi-Nozzle Jacketed Tube with Plates in Place, Isometric Section View.

When the two plates 31, 32 are assembled in place (FIGS. 19 and 20), the narrow tubes 36 from the top plate 31 project down through the larger openings (jacket) 37 in the bottom plate 32. During deposition, the filling substance 2 extruded through the tubes 36 is completely surrounded by the tempered chocolate 1 extruded through the jackets 37. One application of this technique involves heating the chocolate 1 or both the filling substance 2 and chocolate 1 such that they have compatible viscosity properties and depositing both filling substance 2 and chocolate 1 through multiple jacketed tubes into the mold cavity of the single shot mold 40 to create mold, filled single deposition basic products. The filling substance 2 is suspended in the tempered chocolate forming orbs or pearls of flavor 12, also known as inclusions. Due to the properties of the filling substance 2, such as density and surface adhesion characteristics of both the chocolate and filling substance, the inclusions do not form tailings within the chocolate 1, rather forming orbs or pearls of flavor 12. Also, the pearls of flavor 12 do not bottom out in the tempered chocolate 1, but rather remain suspended in the chocolate 1 until the chocolate 1 solidifies.

The number of tubes 36 and jackets 37 correspond to the number of pearls of flavor 12 to be produced within the chocolate 1. If the confectionery is to contain nineteen (19) pearls of flavor 12, then the top plate 31 will have nineteen (19) tubes 36 and the bottom plate 32 will have nineteen (19) jackets 37, as shown in FIGS. 15 and 16. The number of tubes 36 and number of jackets 37 are equal, and to vary the number of pearls of flavor 12 in the confectionary it is necessary to vary the number of tubes 36 and jackets 37. That is, the multi-nozzle jacketed tube assembly 30 includes multiple jacketed tubes that can vary in quantity from 2 on up, depending on how many pearls of flavor 12 are to be formed in the chocolate.

The ratio of chocolate 1 to filling substance 2 can be controlled by varying the pressure exerted on the respective inputs of each ingredient by the depositor machine.

Figure 21:
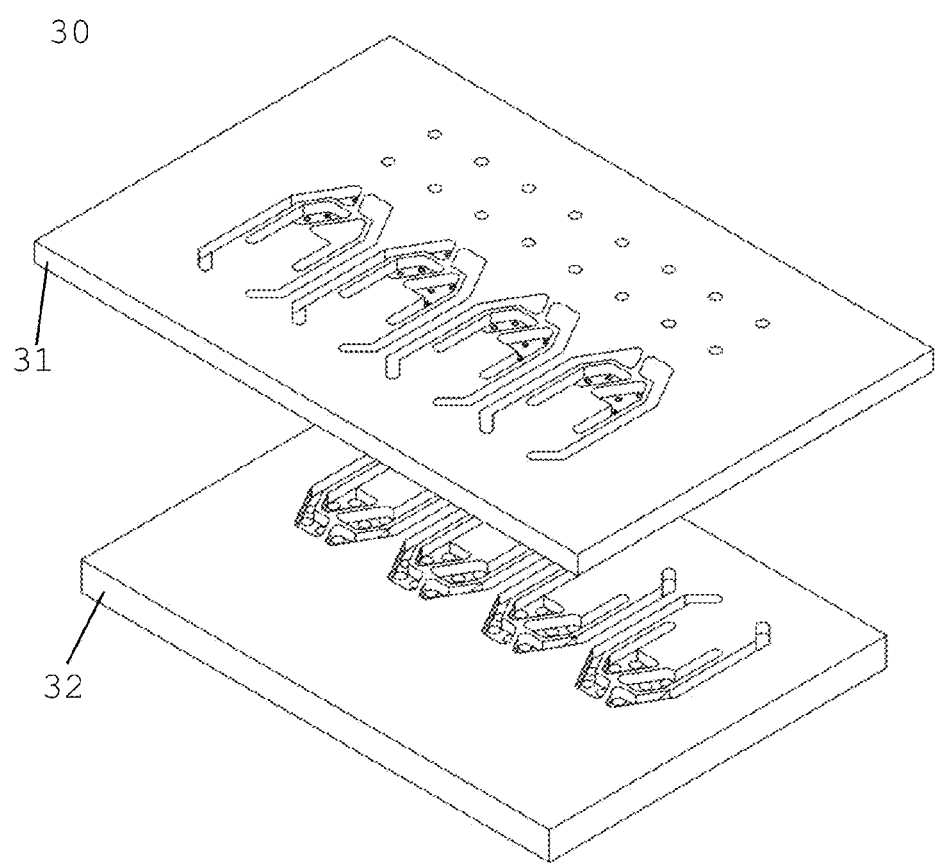
FIG. 21: Four Unit Multi-Nozzle Jacketed Tube with Plates Separated, Isometric Top View.
Figure 22:
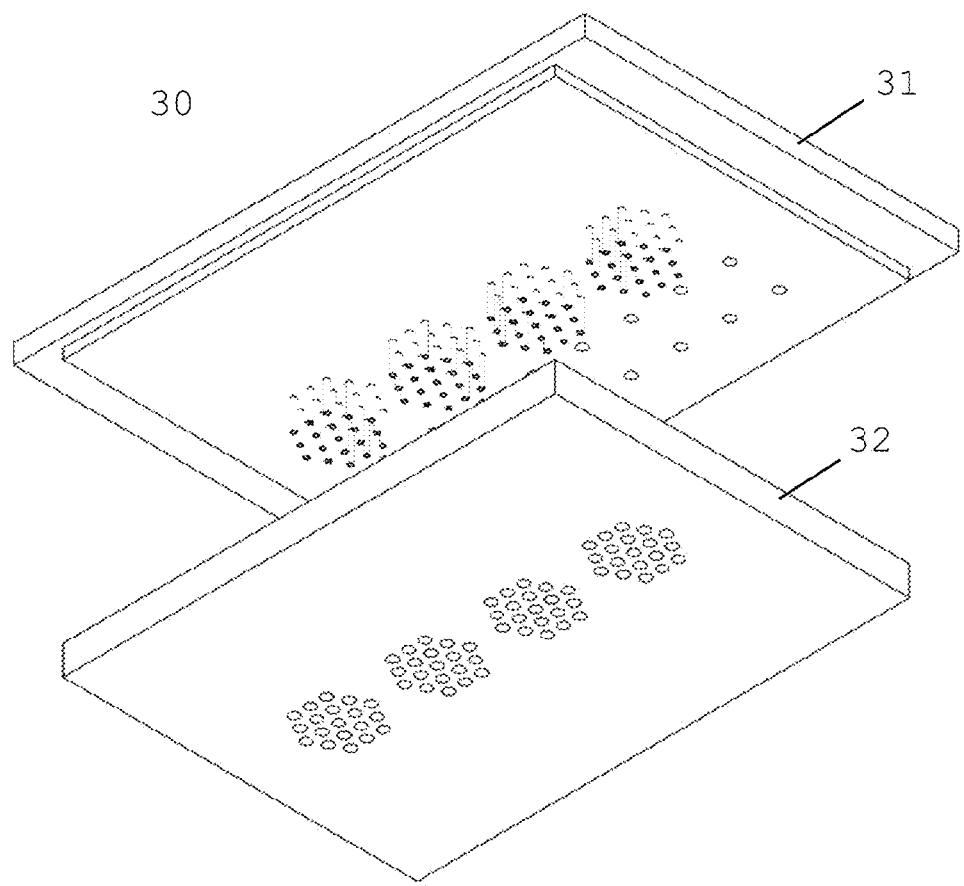
FIG. 22: Four Unit Multi-Nozzle Jacketed Tube with Plates Separated, Isometric Bottom View.

In a manufacturing line, multiple units of filled single deposition basic products will typically be produced concurrently. FIGS. 21 and 22 depict a multi-nozzle jacketed tube assembly 30 capable of producing four units concurrently. Other size plates with more or less number of units are contemplated.

The manifold topology of the Multi-Nozzle Jacketed Tube assembly (also known as a cluster) 30 makes it an efficient vehicle for heat exchange. This has the undesirable result that as tempered chocolate 1 passes through the narrow passages, heat dissipates and the tempered chocolate 1 will eventually begin to crystallize or "seize", obstructing the nozzle passages and bringing production to a halt.

This effect of obstructing the nozzle passages can be remedied by regulating the temperature of the plates 31 and 32 themselves rather than by depending on the temperature of the tempered chocolate 1 alone to sustain adequate heat throughout the deposition process. The effectiveness of temperature regulation will depend on the thermal conductivity of the material used to construct the deposition plates 31 and 32. For example, aluminum plates will respond more effectively to temperature regulation than will plates constructed of nylon or other plastics.

Electrothermal Regulation—The temperature of the deposition plates can be regulated through a combination of electrical heating and electrical temperature control devices. One embodiment of this principle would include adhesion of a silicone rubber heating strip to the exterior of the depositor plate and connecting it to an electrical temperature control device (not shown).

Hydrothermal Regulation—The temperature of the deposition plates can also be regulated using heated water or other fluid. This may be achieved by boring passageways through which water can flow. The temperature of the water can be managed to a specific temperature, which ensures that the deposition plates will maintain that same temperature throughout the process. The target temperature of the plates is solely a function of the type of chocolate being deposited. The primary goal is to keep the chocolate at a constant temperature. For example, dark chocolate needs to be at a constant temperature of 90 degrees Fahrenheit. The temperature for white and milk chocolates vary from that of dark chocolate.

Figure 23:
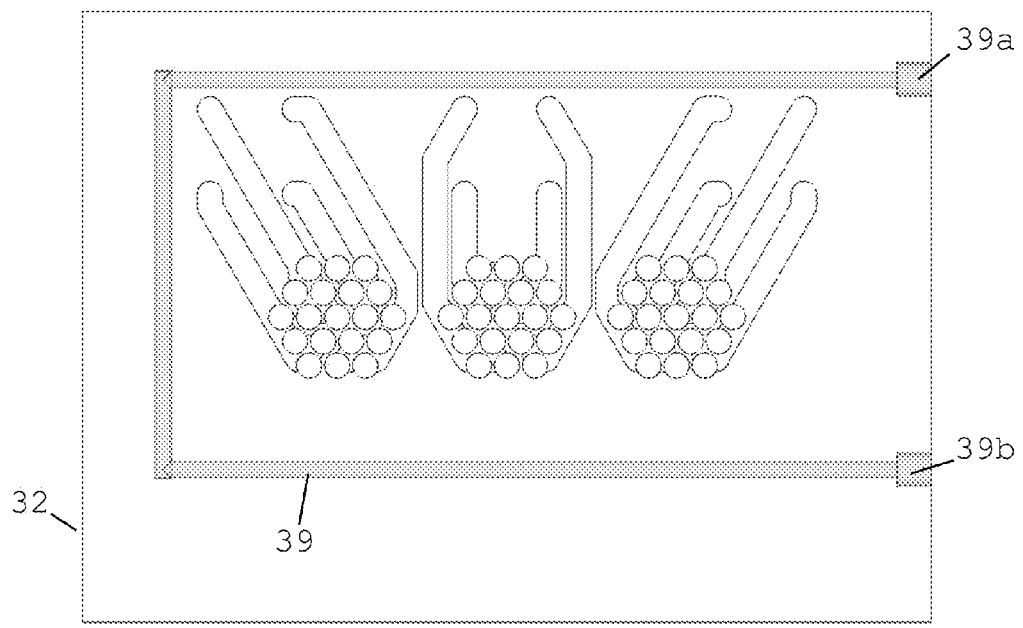
FIG. 23: Bottom Plate for Multi-Nozzle Jacketed Tube Deposition with Hydrothermal Regulation Channel, Plan View with Transparency.
Figure 24:
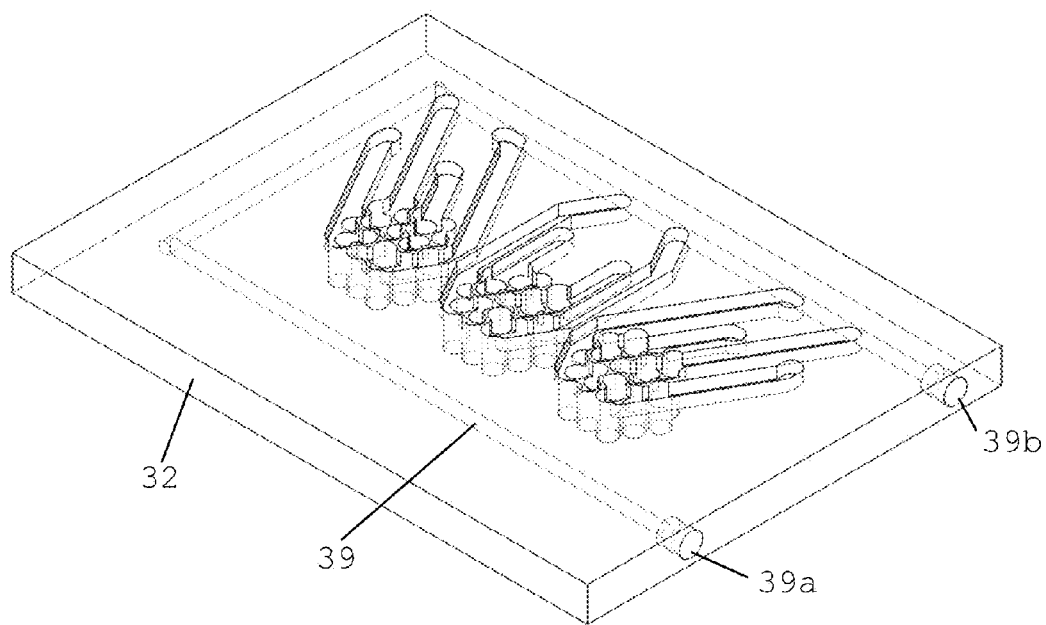
FIG. 24: Bottom Plate for Multi-Nozzle Jacketed Tube Deposition with Hydrothermal Regulation Channel, Isometric View with Transparency.

FIGS. 23 and 24 depict a hydrothermal channel 39 bored through the bottom plate 32 of a multi-nozzle jacketed tube deposition assembly 30. Hose connectors not shown can be threaded into either end 39*a* and 39*b* of channel 39 and attached to water lines not shown through which heated water will flow, maintaining the plate at the desired temperature. Alternative connections, such as quick connects, may be used to connect water lines to the channel 39 of the bottom plate 32.

Mold for Multi-Nozzle Single Shot Deposition

Figure 25:
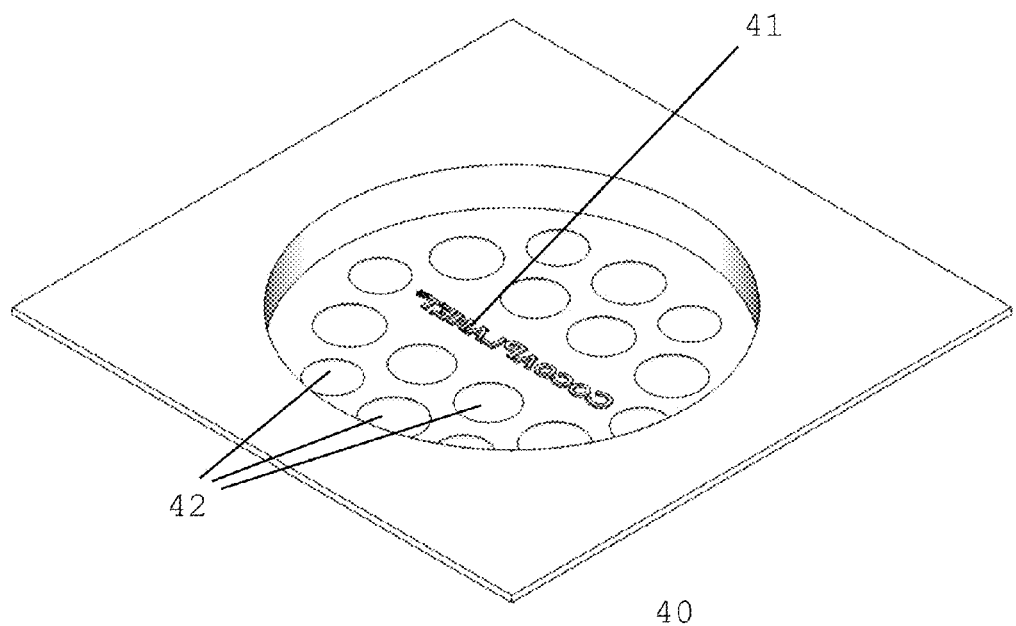
FIG. 25: Mold for Multi-Nozzle Single Shot Deposition, Isometric View.
Figure 26:
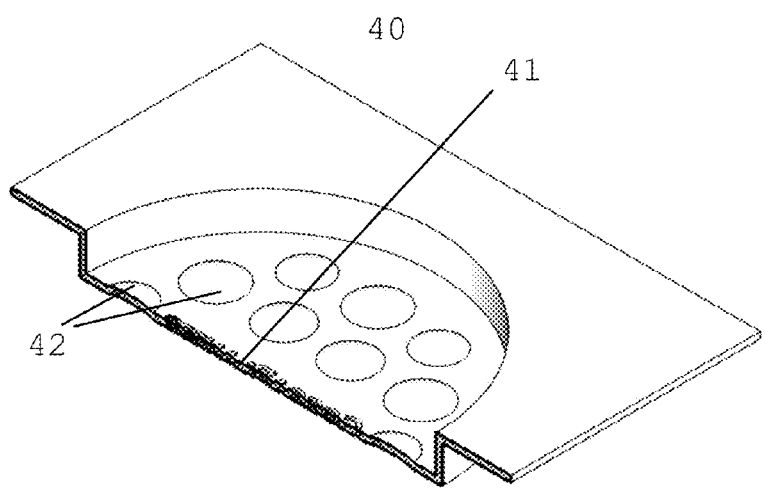
FIG. 26: Mold for Multi-Nozzle Single Shot Deposition, Isometric Section View.

The Modified Single Shot Production Process described above may combine the Multi-Nozzle Jacketed Tube 30 with a single cavity mold 40. FIGS. 25 and 26 depict a single cavity mold 40 for Multi-Nozzle Single Shot Deposition that will produce the Single Shot Basic Product 10 described previously. The single cavity mold 40 has, in some embodiments, a circular plan shape of diameter 58 mm and depth of 7.0 mm. The single cavity mold 40 dimensions may vary accordingly and may be similar to the mold employed by the Three Stage Production Process. Because a single shot deposition process introduces both chocolate and filling substance simultaneously, the Single Shot Mold 40 does not require structures to create wells for filling material as is described in conjunction with the Three Stage Mold. Unlike with the Three Stage Basic Product where it is optional to include a layer of enrobing chocolate, the Single Shot Basic Product produced by the Modified Single Shot Product Process inherently includes a layer of "enrobing chocolate" because as described the filling substance 2 is completely surrounded by the chocolate 1 extruded through the jackets 37.

In the manufacturing process, the chocolate 1 will enter the plates and ultimately the single shot mold 40 first to create a base layer of chocolate. The operator of the depositor machine will subsequently initiate the flow of the filling substance 2 into the Multi-Nozzle Jacketed Tube assembly 30 while the tempered chocolate 1 continues to flow. At the appropriate time, the operator will cease the flow of the filling substance 2 yet continuing the flow of chocolate 1 allowing the chocolate 1 to completely surround the filling substance 2, due the fact that the filling substance 2 is no longer extruded out of the tubes 36 because the flow of filling substance was terminated. The flow of the tempered chocolate is continued and deposited into the single shot mold 40 until the single shot mold 40 is completely filled. The activation sequence/timing of the flow of chocolate 1 and filling substance 2 is determined by the viscosity properties of the substances, the temperature and physical characteristics of the Multi-Nozzle Jacketed Tube assembly 30. The chocolate 1 and filling substance 2 in the single shot mold 40 are allowed to cool. Once the chocolate 1 is in solid form/phase the chocolate with the embedded pearls of flavor 12 is removed from the mold 40. The filling substance 2 forming the pearls of flavor 12 may remain in a liquid or semi-liquid phase or may be in a solid phase after cooling.

The depositor machine may have the capability to automatically control the flow of the chocolate 1 and filling substance 2 through appropriate software and hardware, allowing the depositor to start and stop the flow of substances in accordance with a set of predetermined factors.

The single shot mold 40 can also include cosmetic features 41. The bottom of this mold can include cosmetic features 41 including product logo text and shallow (e.g., 1 mm depth) ellipsoidal section depressions 42 that suggest the filling cells in the tiling pattern.

Figure 27:
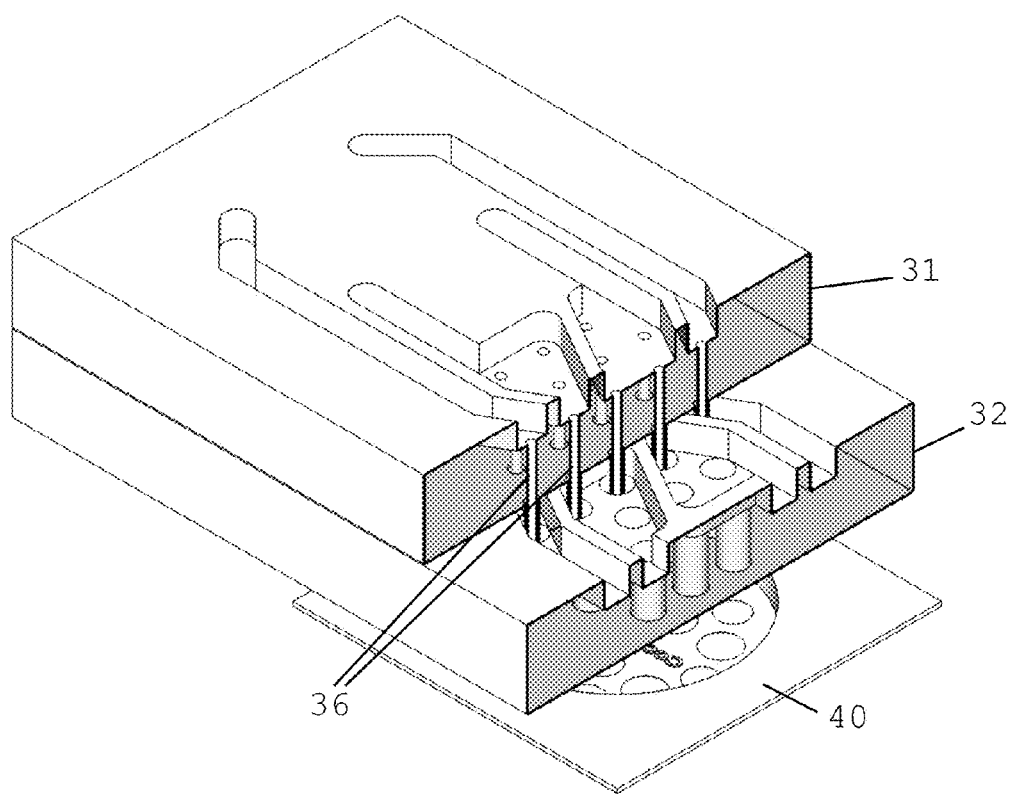
FIG. 27: Multi-Nozzle Jacketed Tube with Mold, Isometric View with Staggered Section.
Figure 28:
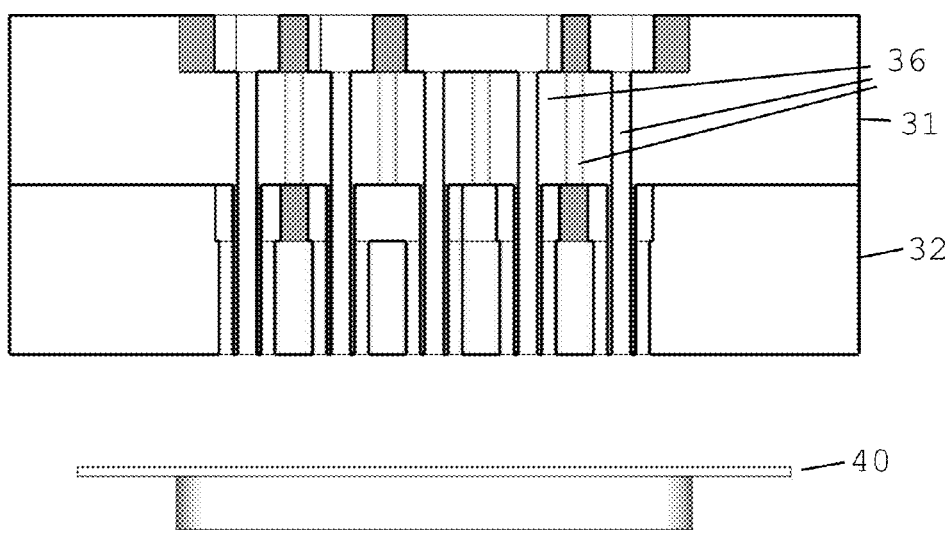
FIG. 28: Multi-Nozzle Jacketed Tube with Mold, Section View.

FIGS. 27 and 28 depict a single shot mold 40 positioned under the Multi-Nozzle Jacketed Tube assembly 30, ready for single shot deposition.

Three Stage Production Process

An embodiment for the manufacturing of the three stage basic product 20 has three primary stages: chocolate deposition, filling deposition and enrobing.

Figure 29:
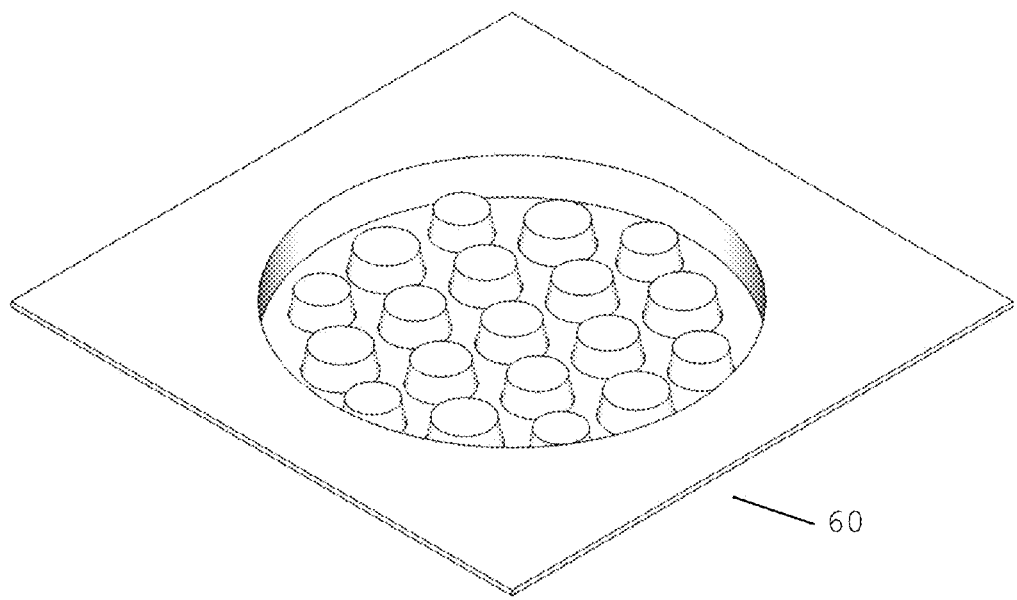
FIG. 29: Basic Molded Chocolate Wafer Mold, Isometric View.
Figure 30:
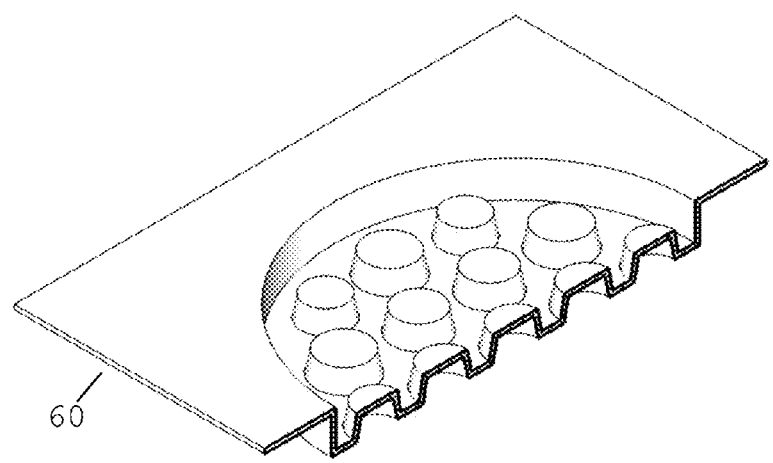
FIG. 30: Basic Molded Chocolate Wafer Mold, Isometric Section.

Chocolate Deposition—In the first manufacturing stage, tempered chocolate is deposited into a negative form mold to create the (positive form) molded chocolate wafer described previously. FIG. 29 depicts an example of a negative form mold 60. FIG. 30 is an isometric section of a basic molded chocolate wafer mold 60. After deposition the mold may be shaken horizontally to aid distribution of the tempered chocolate within the mold. The filled mold may pass through a "cooling tunnel" (not shown) to reduce the temperature of the tempered chocolate and allow it to solidify. Then, the positive form molded chocolate wafer 21 is released (removed) from the negative form mold 60.

Filling Deposition—In the second manufacturing stage, filling material 23 is deposited into the wells 22 of the wafer 21. Distribution of the filling material 23 among the wafer's multiple wells 22 can be achieved in a variety of different ways, examples of which are described below.

Figure 31:
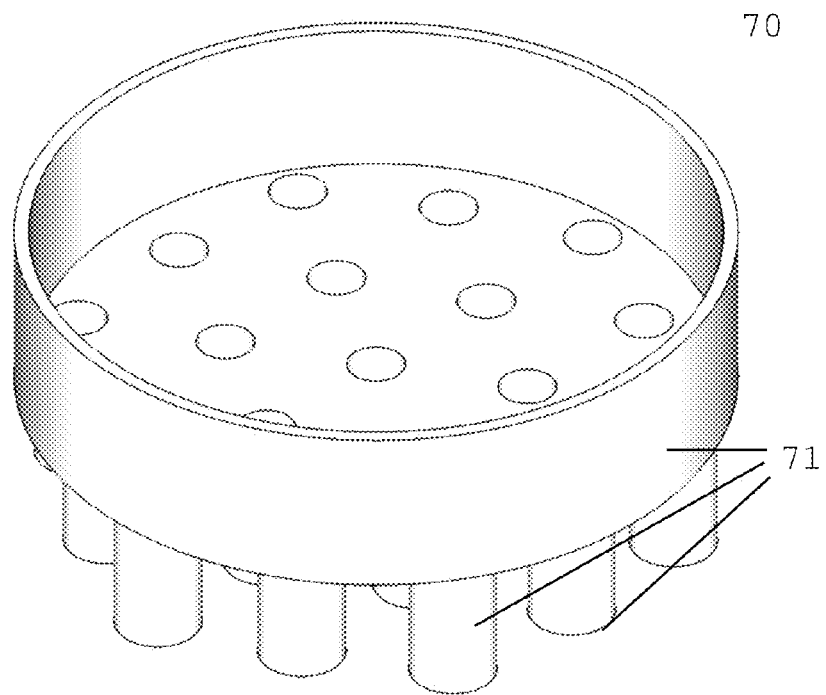
FIG. 31: Cylindrical Multi-Nozzle, Isometric View.
Figure 32:
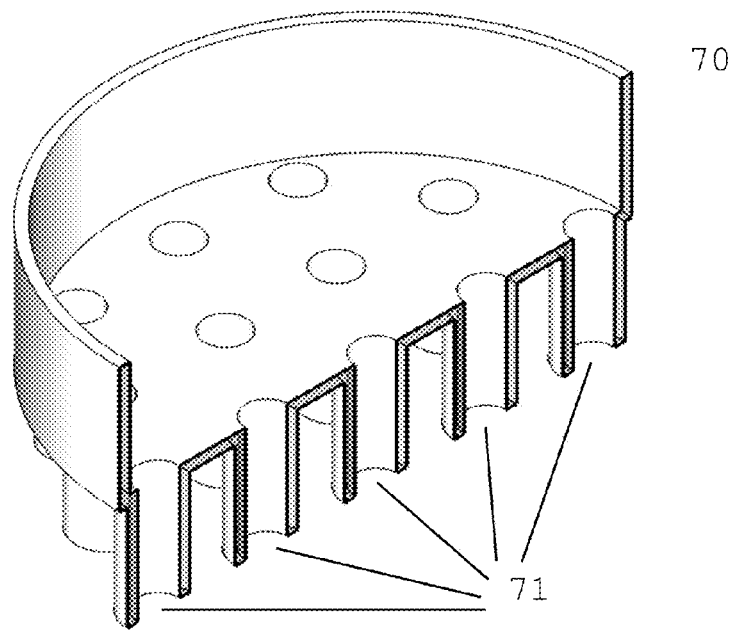
FIG. 32: Cylindrical Multi-Nozzle, Isometric Section View.

Multi-nozzle Deposition—FIGS. 31 and 32 depict a multi-nozzle designed for use with the wafer 21 for the three stage basic product. In some embodiments, multi-nozzle deposition uses a specially constructed manifold chamber 70 with a single input line (not shown) and multiple output nozzles 71. The manifold chamber 70 has a wall 74 encircling the chamber to contain the filling substance within the manifold chamber. The design/layout of the multiple output nozzles 71 is to the same as the tiling pattern of the wafer 21 being filled.

Figure 33:
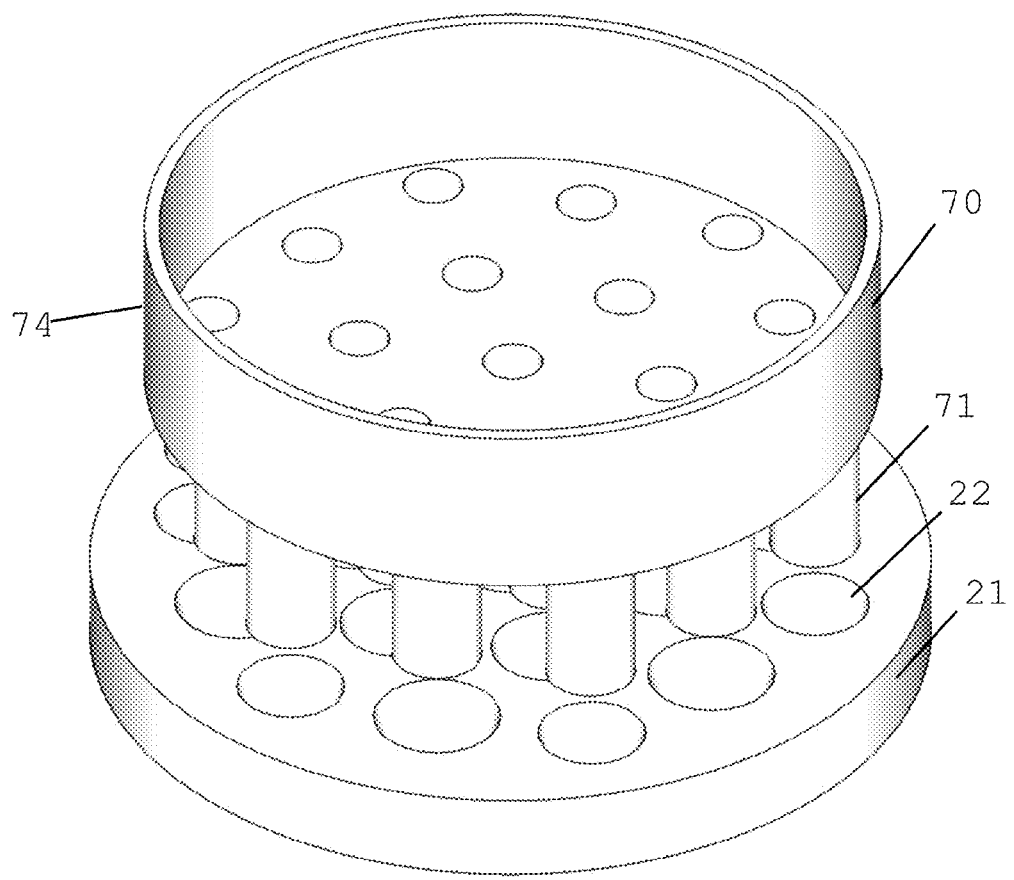
FIG. 33: Basic Molded Chocolate Wafer with Cylindrical Multi-Nozzle, Isometric View.
Figure 34:
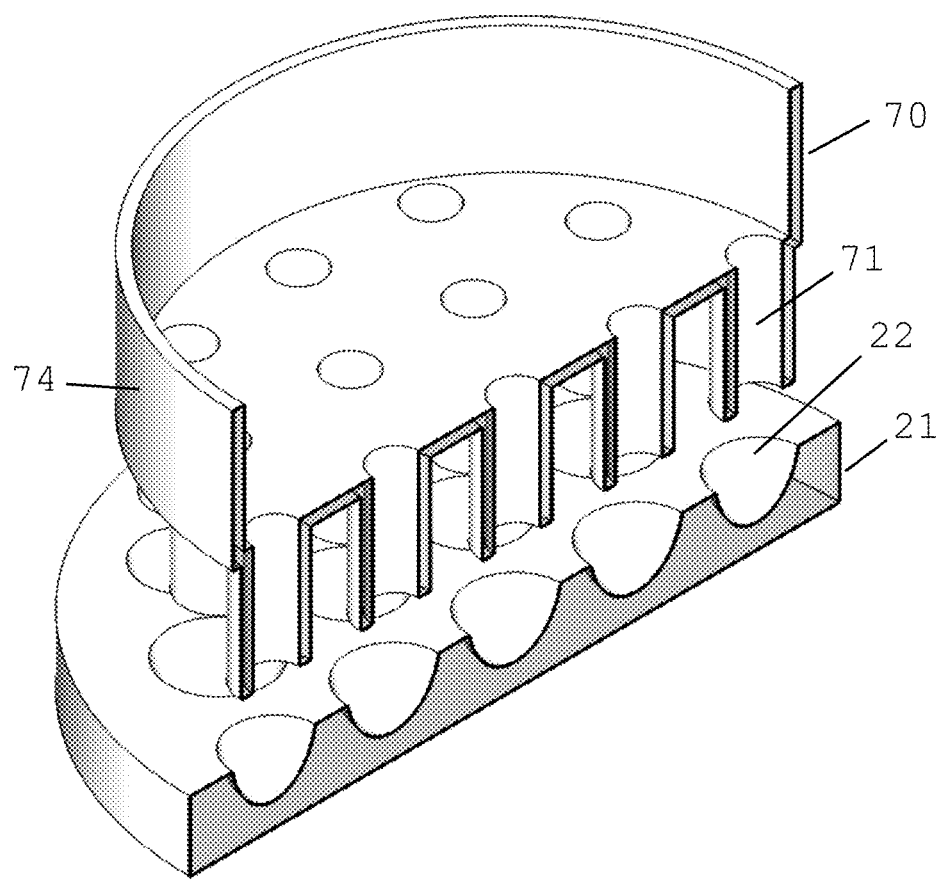
FIG. 34: Basic Molded Chocolate Wafer with Cylindrical Multi-Nozzle, Isometric Section View.
Figure 35:
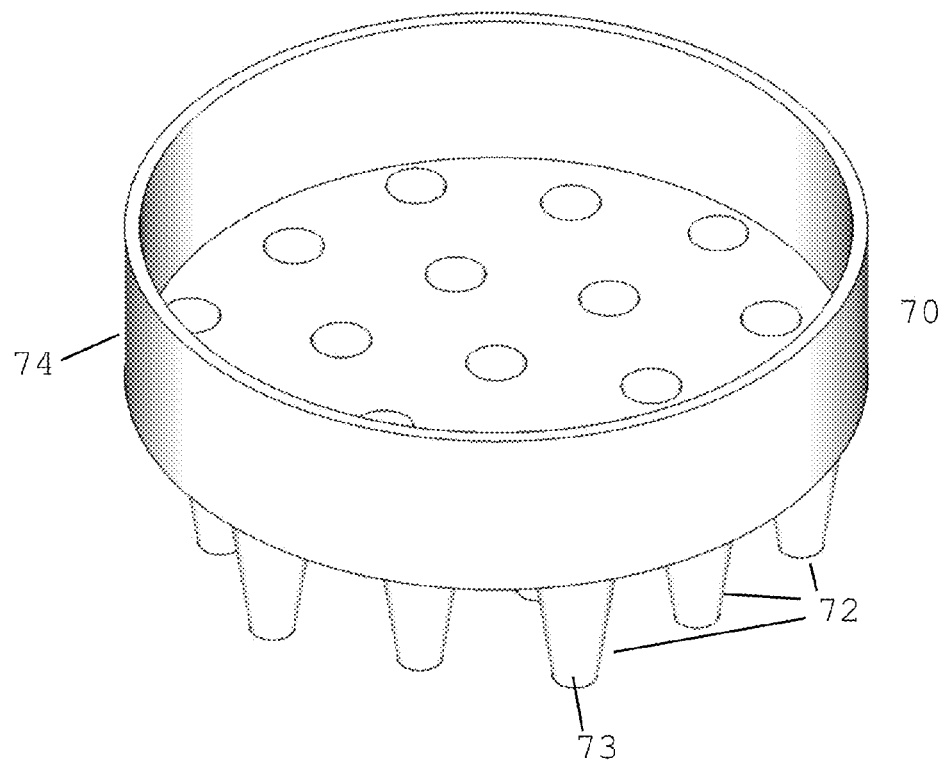
FIG. 35: Conical Multi-Nozzle, Isometric View.
Figure 36:
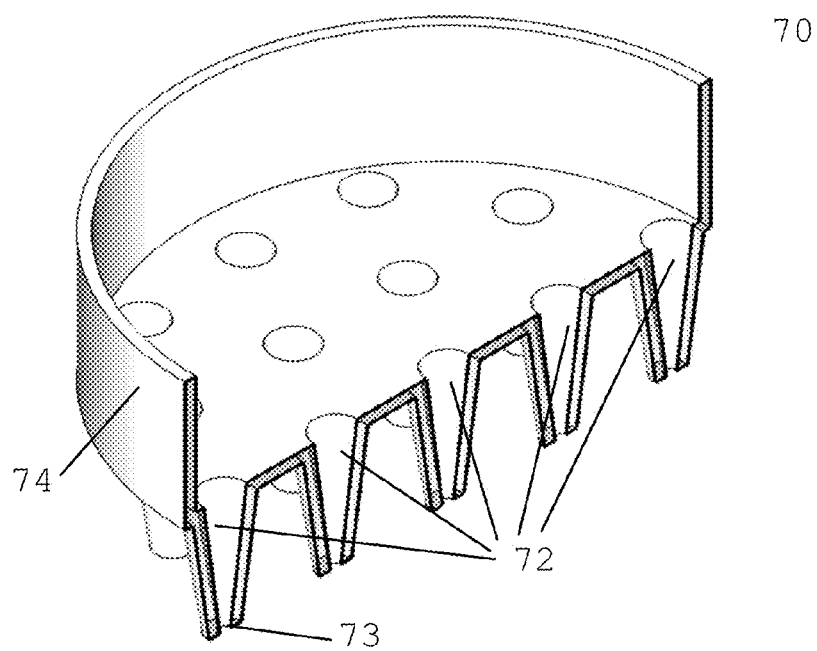
FIG. 36: Conical Multi-Nozzle, Isometric Section View.

There is one output nozzle 71 for each well 22 in the wafer's 21 tiling pattern. Each of the output nozzles 71 is positioned to align above the center of a corresponding well 22 in the wafer 21 top surface (FIGS. 33 and 34). In wafer tiling patterns where the volume of all wells is not uniform, the diameter of each output nozzle 71 is adjusted (increased or decreased) in proportion to the variation in well volume relative to other wells 22.

Optimal filling deposition in an automated process can be adjusted based on any of several variables, including well volume, nozzle diameter, viscosity of filling material and pressure exerted on filling material during deposition. FIGS. 33 and 34 depict a multi-nozzle design with conical rather than cylindrical nozzles. The conical nozzle 72 form reduces the diameter of the nozzle tip 73, which increases the pressure and reduces the volume of filling material 23 extruded. This variation is suitable to filling materials 23 which are relatively more viscous.

Figure 37:
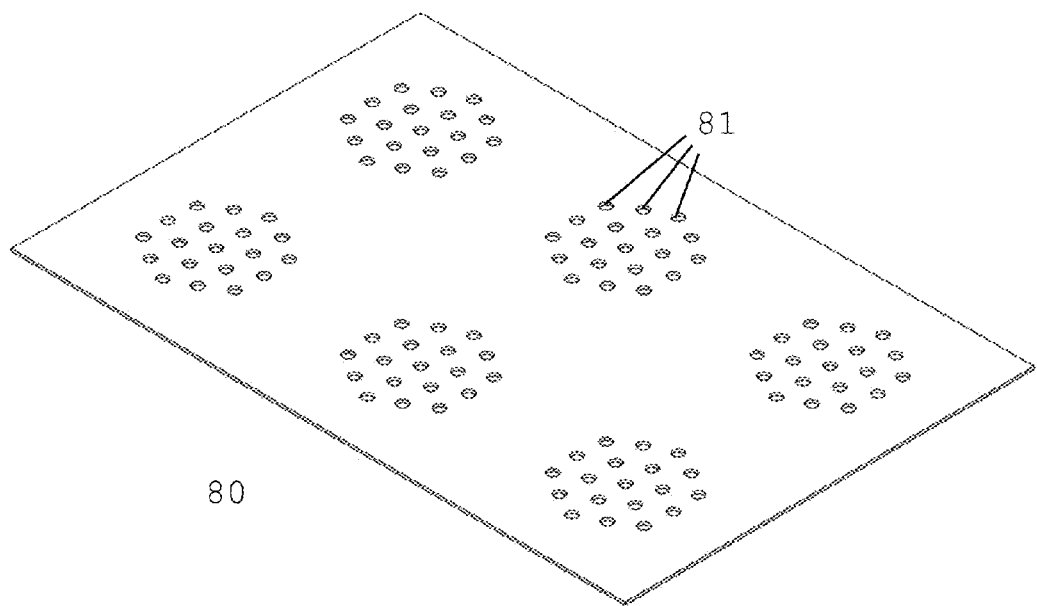
FIG. 37: Plate Multi-Nozzle, Isometric View.
Figure 38:
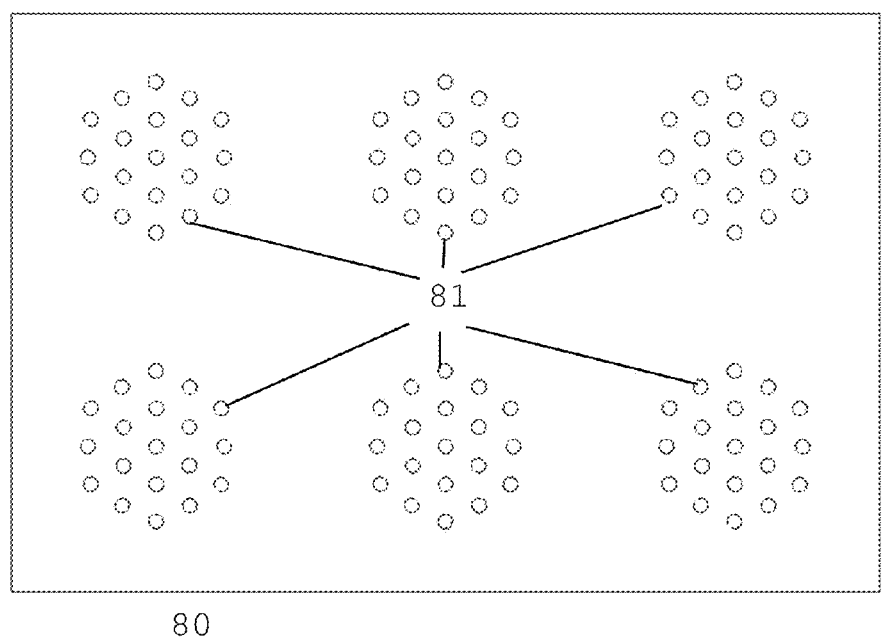
FIG. 38: Plate Multi-Nozzle, Plan ViewError! Bookmark not defined.

Plate Multi-Nozzle Deposition—Some industrial depositors (machines used for deposition) employ a plate with perforations that are aligned to the targeted areas for deposition. FIGS. 37 and 38 show a plate 80 with multi-nozzle perforations 81 designed for use with six wafers 21 of the three stage basic product 20.

Mobile Single Nozzle Deposition—A single nozzle 90 (one input line not shown, one output nozzle 91) can also be used to distribute the filling material 23 among the wafer's 21 multiple wells 22. The nozzle 91 is repositioned to align above the center of each well 22 on the wafer 21 top surface 25.

Figure 39:
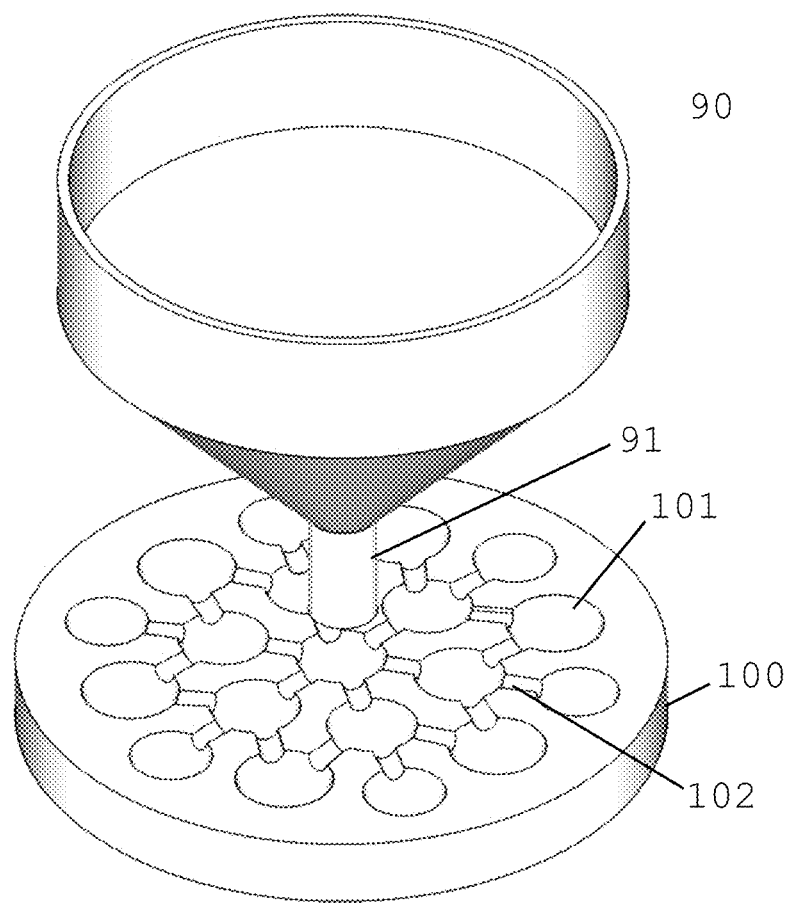
FIG. 39: Basic Channeled Wafer with Single Nozzle, Isometric View.
Figure 40:
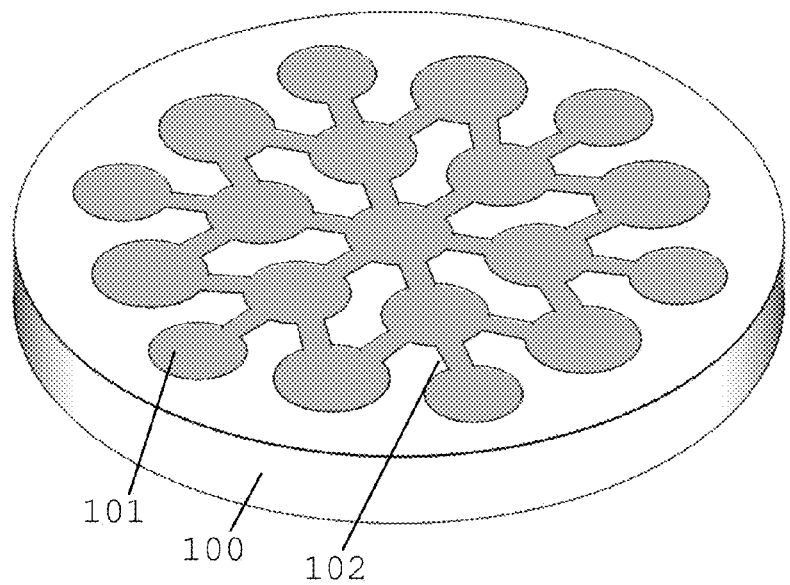
FIG. 40: Basic Channeled Wafer after Filling Deposition, Isometric View.

Stationary Single Nozzle Deposition—A faster, less mechanically demanding method of single nozzle deposition involves a stationary single nozzle 90 and a modified wafer design 100 (also referred to herein as a "Channeled Wafer"). FIG. 40 shows an example of a channeled wafer 100 with a single nozzle 90 positioned directly above the channel wafer 100. In the Channeled Wafer 100, all wells 101 are linked via linear depressions (also referred to herein as "channels") 102 in the wafer surface. The single nozzle 90 is positioned to align above the center of a single (typically central) well 102 (FIG. 39). The channels 102 allow filling material 23 to flow from the well 101 below the nozzle 91 to all other wells 101 in the tiling pattern. Horizontal shaking can aid the distribution of filling material throughout the network of channels 102 and wells.

Enrobing—In the third manufacturing stage, the filled wafer is covered (enrobed) in a thin coating of chocolate. The enrobing process known in the industry involves passing the filled wafer through a wide sheet ("curtain") of continuously flowing tempered chocolate. This enrobing curtain covers the filled wafer uniformly, and after the enrobing chocolate cools, it solidifies.

Wafer Mold Production

The negative form mold 60, discussed previously, for molded chocolate wafers 21 can be produced using a variety of different techniques, including those described below.

Vacuum Forming

Figure 41:
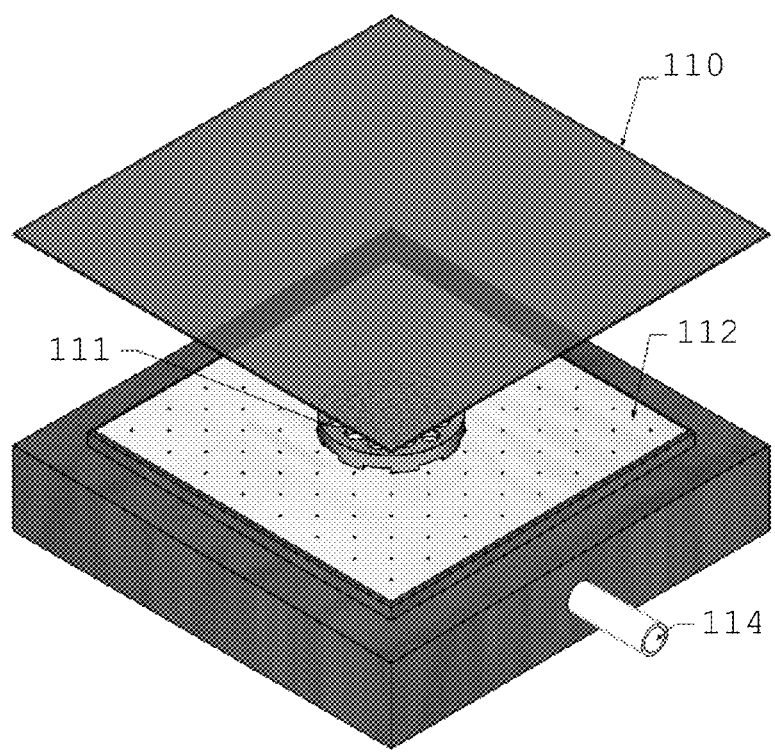
FIG. 41: Thermal Plastic Sheeting, Basic Molded Chocolate Wafer Positive Form and Vacuum Forming Platen, Exploded Isometric View.

FIG. 41 depicts an exploded isometric view of a thermal plastic sheeting, basic molded chocolate wafer positive form and a vacuum forming platen. Vacuum forming applies vacuum suction to deform heated (food grade) thermal plastic sheeting 110 around a positive form 111 by removing the air between the plastic 110 and the positive form 111. As the thermal plastic 110 cools, it hardens into a negative form mold 60. Typically, the vacuum suction is created by placing both the positive form 111 and the heated thermal plastic sheeting 110 on a flat, perforated surface (vacuum forming platen) 112 in which each perforation 113 is connected to a vacuum suction line 114.

Figure 42:
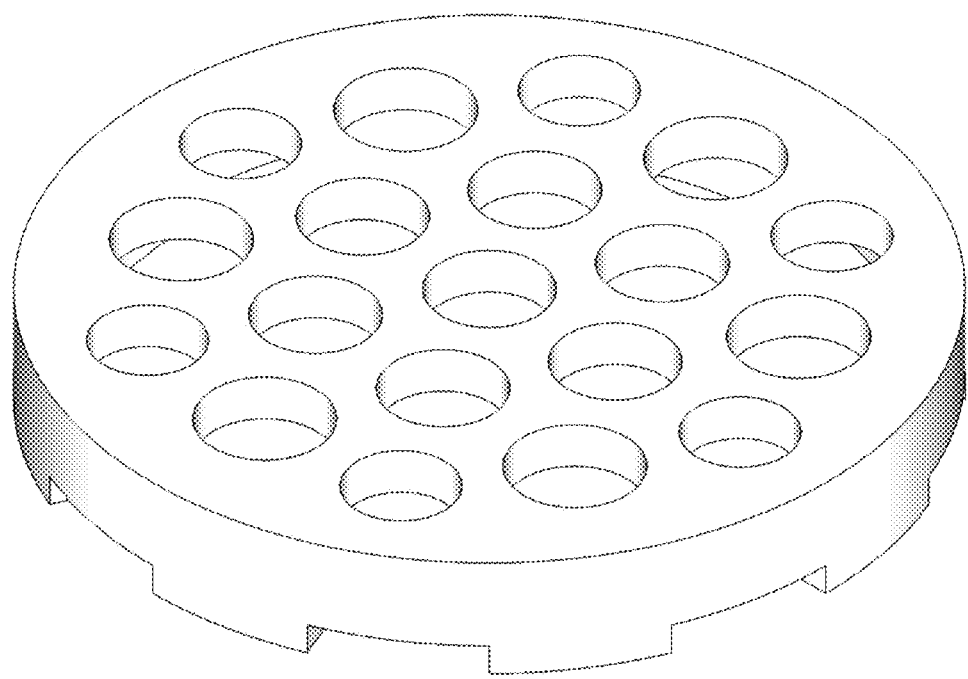
FIG. 42: Basic Molded Chocolate Wafer Positive Form, Isometric View.

FIG. 41 shows the placement of the positive form 111 on a typical vacuum forming platen 112, and the positioning of the heated thermal plastic sheeting 110 above both platen 112 and form 110. FIG. 42 is an example stainless steel positive form for the basic molded chocolate wafer 21 and FIG. 25 is an example of the negative form plastic mold 60 produced using vacuum forming.

The efficacy of vacuum forming depends in large degree on the variable elasticity of the thermal plastic sheeting 110 relative to temperature. Effective vacuum forming requires that, when heated, the plastic 110 be sufficiently elastic that it deforms to an extent which replicates the positive form 111 in detail. The vacuum suction is the driving force behind this deformation and also has a cooling effect on the thermal plastic 110, introducing a risk that the plastic hardens without fully deforming.

Figure 43:
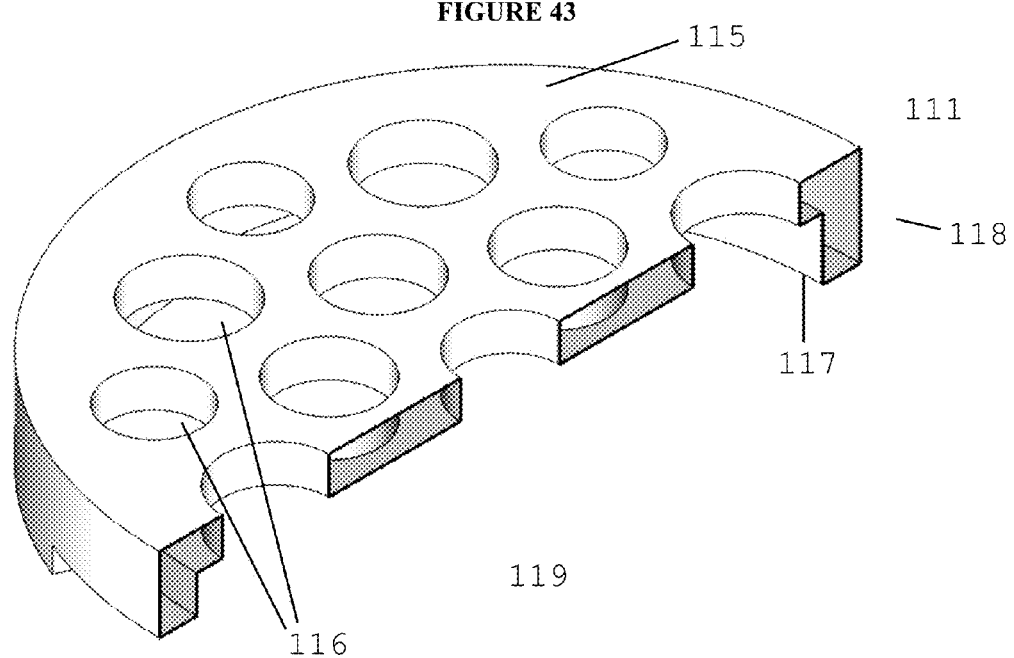
FIG. 43: Basic Molded Chocolate Wafer Positive Form, Isometric Section View.

Design of the positive form 111 is one factor in the effectiveness of vacuum forming. FIGS. 42 and 43 depict a positive form 111 for the basic molded chocolate wafer 21.

Two exemplary aspects of positive form 111 design that aid vacuum forming efficacy are geometric attributes and material attributes.

Geometric Attributes—The top surface features circular perforations 116 that correspond to the wells 22 in the basic molded chocolate wafer's 21 tiling pattern. The bottom 117 of the form is open, and the bottom edge of the cylindrical side wall features an inverted crenellation 119. The perforations 116 and crenels 119 allow air to flow through the positive form's 111 interior to facilitate vacuum suction down through the vacuum forming platen 112.

As the thermal plastic sheet 110 is sucked into the circular perforations 116, it deforms into a hemispheric or hemi-ellipsoidal shape. The resulting negative form mold 60 will therefore create hemispheric or hemi-ellipsiodal wells.

Material Attributes—The thermal properties of the material used for the positive form 111 may have impact the efficacy of vacuum forming. Positive forms 111 made of materials with higher thermal conductivity (e.g. metals) can be pre-heated prior to the vacuum forming process. Then, during the vacuum forming process, the positive form 111 will transfer additional heat to the plastic sheeting, thereby delaying cooling and extending time during which the plastic 110 remains elastic. Changing the wall 118 thickness of the positive form 111 allows it to store more or less heat, as the application requires.

Silicone Casting

Silicone casting is another process for manufacturing a wafer mold. Silicone casting involves a positive form 130 which is surrounded by a containing wall 120 into which (food grade) liquid silicone is poured. The liquid silicone is chemically cured to into a negative form mold 121.

Figure 44:
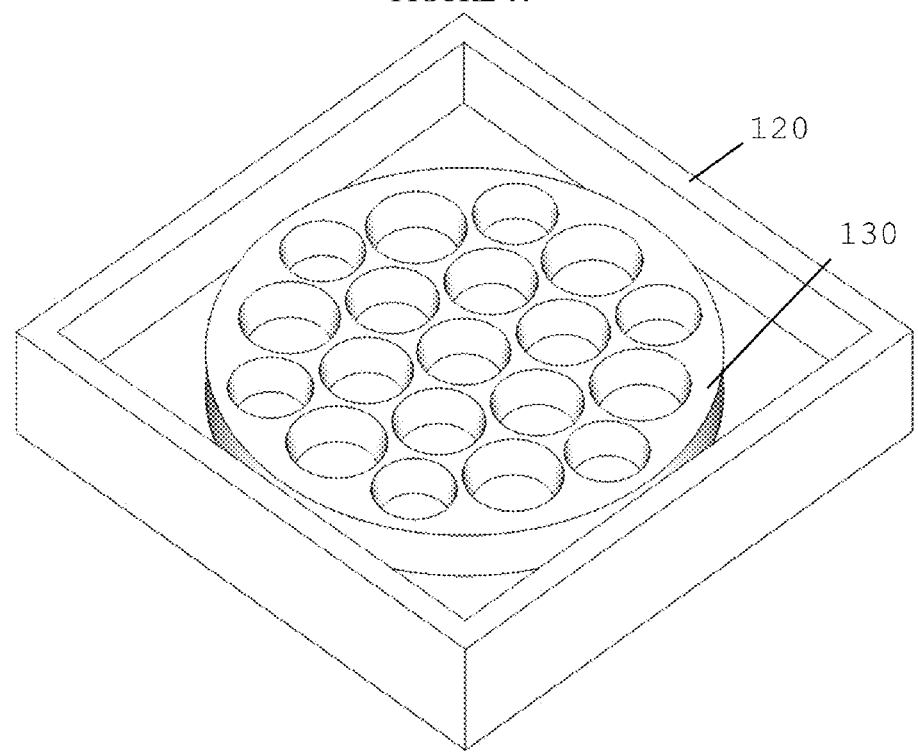
FIG. 44: Basic Molded Chocolate Wafer Positive Form with Containing Walls, Isometric View.
Figure 45:
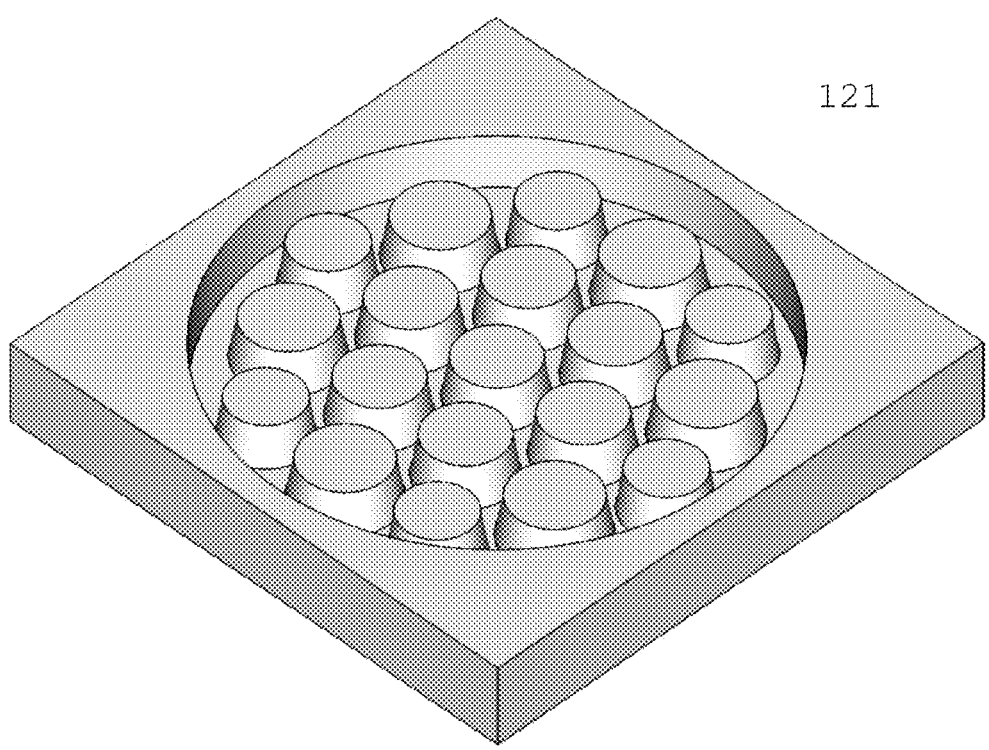
FIG. 45: Basic Molded Chocolate Wafer Silicone Negative Form Mold, Isometric View.

FIG. 44 is an isometric view of a basic molded chocolate wafer positive form with containing walls. FIG. 44 shows a positive form 111 with containing walls 120 for the basic molded chocolate wafer 21. FIG. 45 shows the silicone negative form mold produced by the positive form in FIG. 44.

Variations

Variations of the Basic Products described above can be achieved by adjusting any of several attributes. Some of these variations are process independent, i.e. they can be varied in both the Modified Single Shot Production Process and the Three Stage Production Process. Other variations are only relevant to the Three Stage Production Process.

Process Independent Variations

Attributes that can be varied in both the Modified Single Shot Production Process and the Three Stage Production Process include, but are not limited to, wafer size, wafer shape, and tiling pattern. The following are exemplary variations with exemplary values. It is contemplated that these values may vary.

Variant Wafer Sizes—Wafer 10 or 20 size can be varied by increasing or decreasing the wafer's height, width, or depth. FIGS. 46 and 47 illustrate a variant with smaller wafer diameter (37 mm) than the Basic Products described previously. The number of cells 22 or pearls of flavor 12 is reduced to 7 (from 19).

Figure 48:
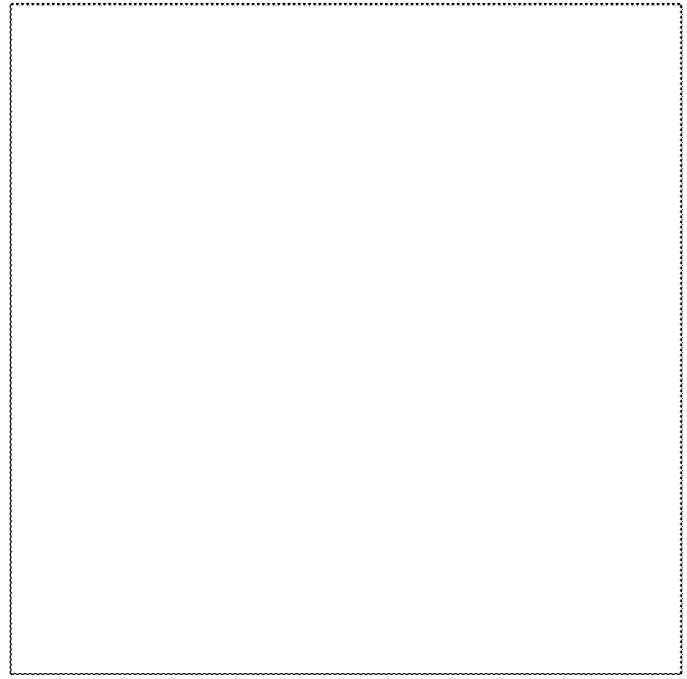
FIG. 48 Square Wafer, Plan View.
Figure 49:
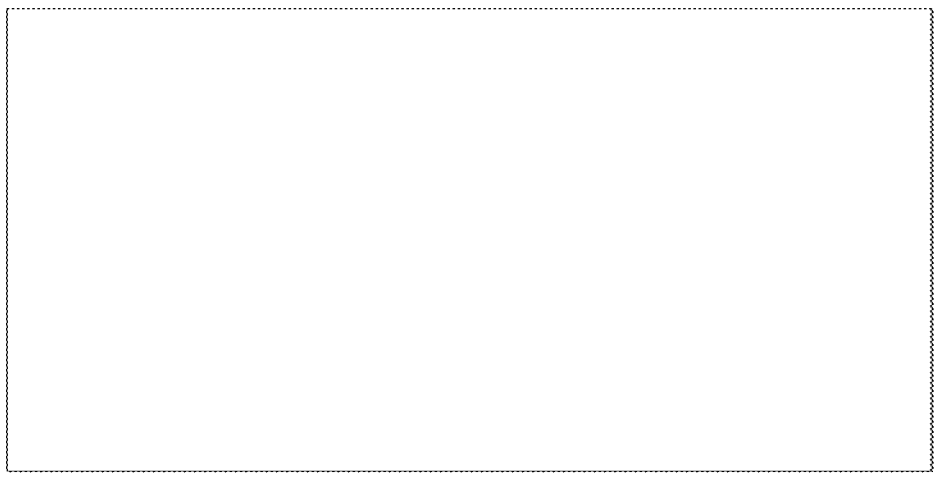
FIG. 49: Rectangular Wafer, Plan View.
Figure 50:
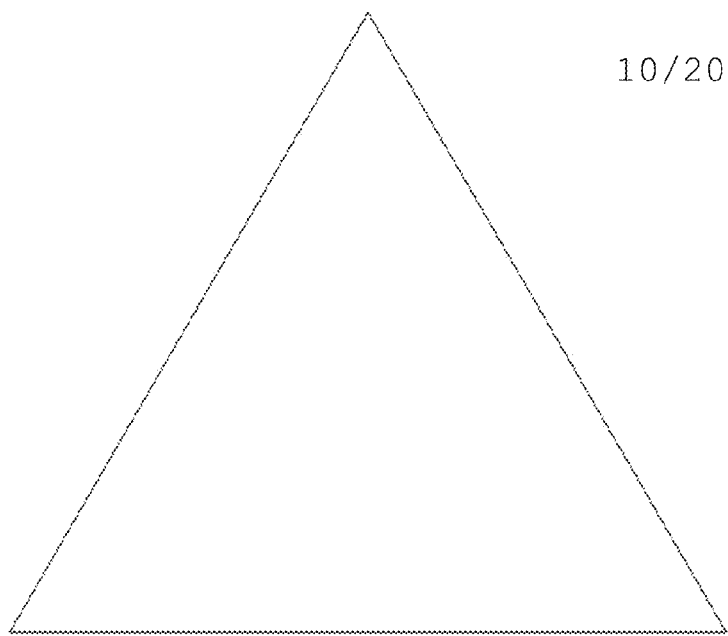
FIG. 50: Triangular Wafer, Plan View.
Figure 51:
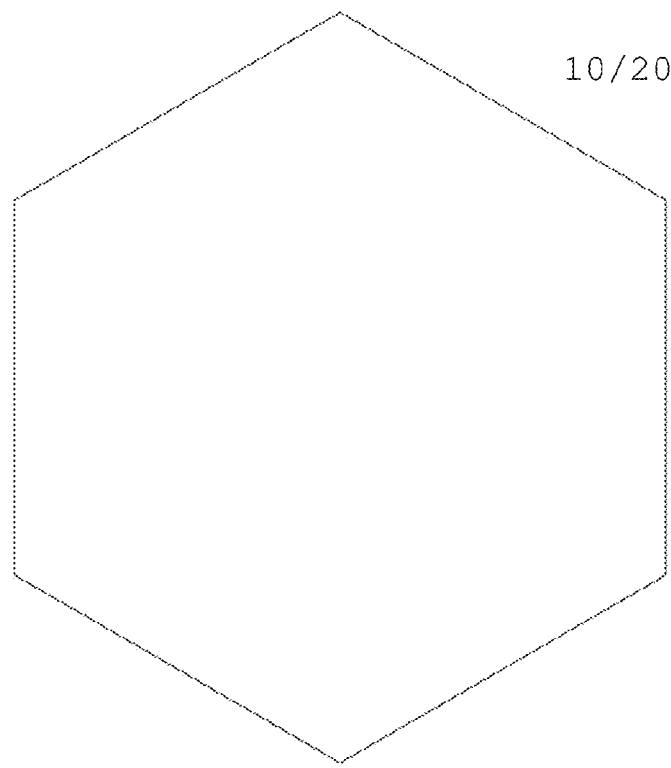
FIG. 51: Hexagonal Wafer, Plan View.

Variant Wafer Shapes—The wafer 10 or 20 can also be varied by modifying the shape of the wafer's plan (i.e. the geometric shape of the wafer when viewed from above). The Basic Products described previously feature a circular plan shape. Examples of variations in plan shape include square (FIG. 48), rectangular (FIG. 49), triangular (FIG. 50) and hexagonal (FIG. 51). Any geometric shape is conceivably feasible.

Variant Tiling Patterns—The wafer 10 or 20 may also be varied by modifying the shape of the wafer's tiling pattern (i.e. the geometric grid within which cells 22 or pearls of flavor 12 are arranged. These modifications can include variations across a wide range structural attributes.

Figure 52:
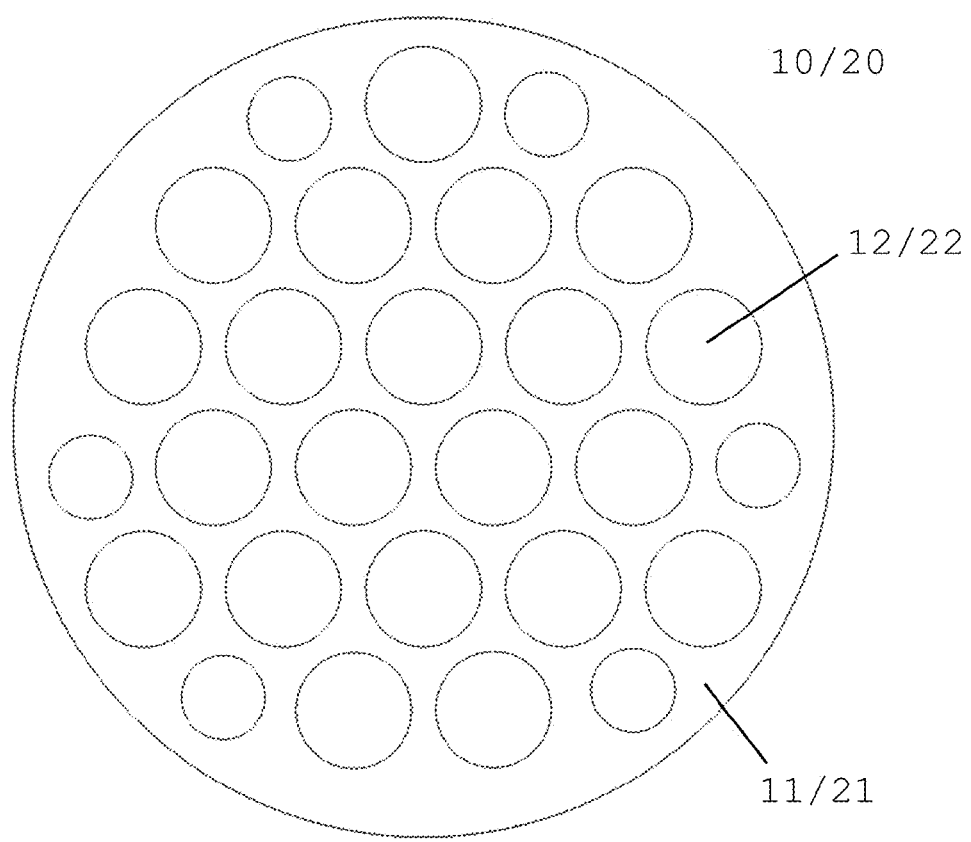
FIG. 52: Circular Wafer with 27 Circular Wells, Plan View.
Figure 53:
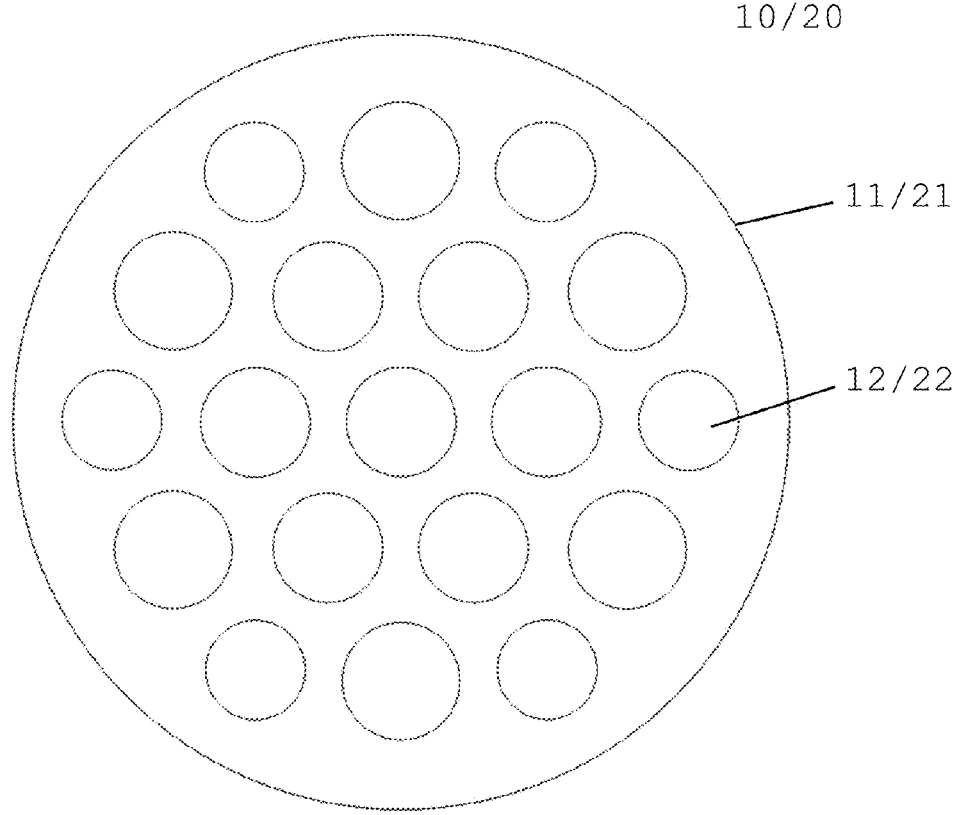
FIG. 53: Basic Product, Plan View.

The Basic Products previously described featured circular plan (hemispheric) cells arranged in a hexagonal tiling pattern where the center of the wafer plan aligns with the center of one of the circular cells in the tiling pattern. One variation is to change this alignment such that, for example, the center of the wafer plan aligns with a point equidistant from the centers of three circular cells in the tiling pattern (FIG. 52). Compared to the Basic Products described previously (FIG. 53), the variation depicted in FIG. 52 will have more cells 22 or pearls of flavor 12 (27 versus 19), resulting in a lower Chocolate to Filling Ratio.

Figure 54:
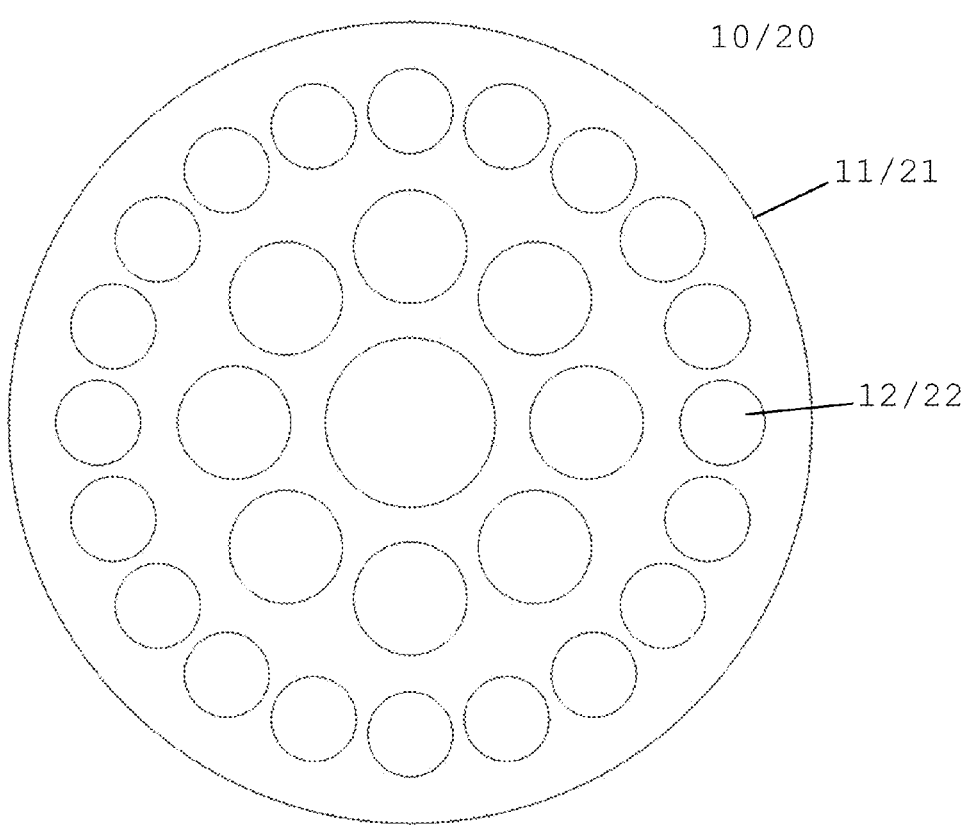
FIG. 54: Circular Wafer with 27 Circular Wells, Plan View.
Figure 55:
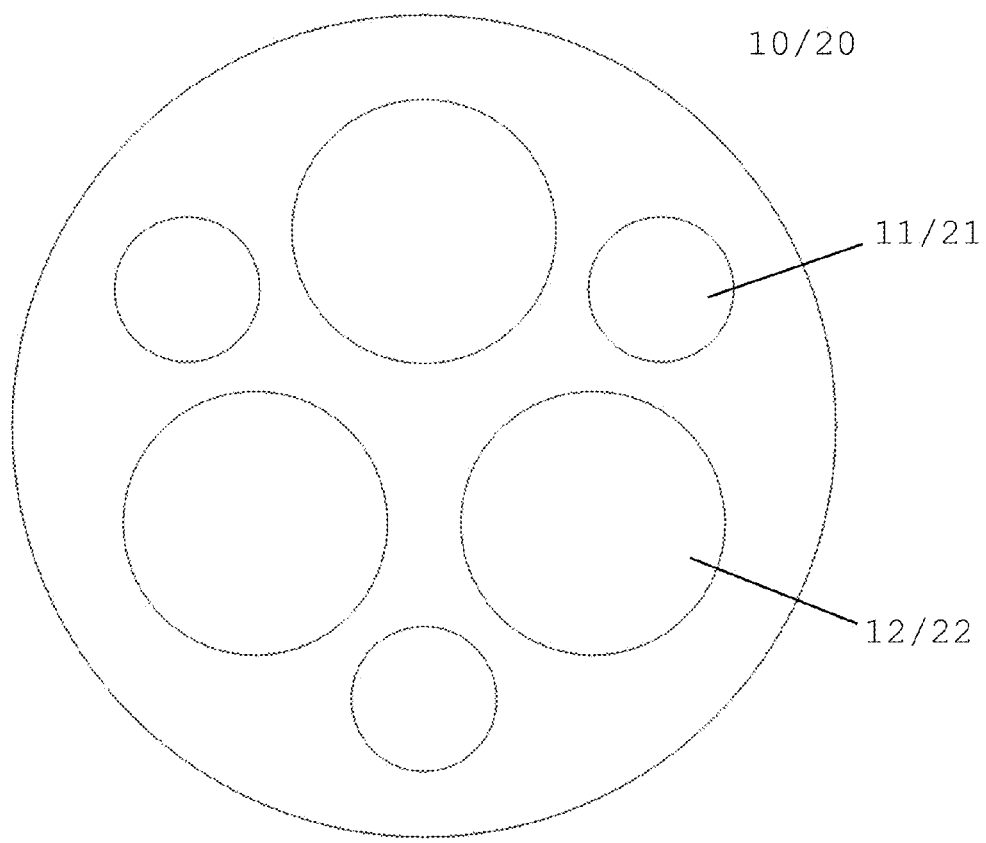
FIG. 55: Circular Wafer with 6 Circular Wells, Plan View.

Another modification is to vary the size of cells or pearls of flavor within the tiling pattern. For example, FIG. 54 shows a tiling pattern of circular plan pearls of flavor or cells 12 or 22 arranged in concentric rings where the well diameter decreases as the diameter of the concentric ring increases. FIG. 55 shows a tiling pattern where the diameter of circular cells is varied to allow a minimum number of pearls of flavors or cells 12 or 22 to optimally cover a circular wafer with a hexagonal tiling pattern Three Stage Product Variations Examples of attributes that can be varied in the Three Stage Production Process include well diameter, well shape and combinations of wafer shape, and tiling pattern.

Figure 56:
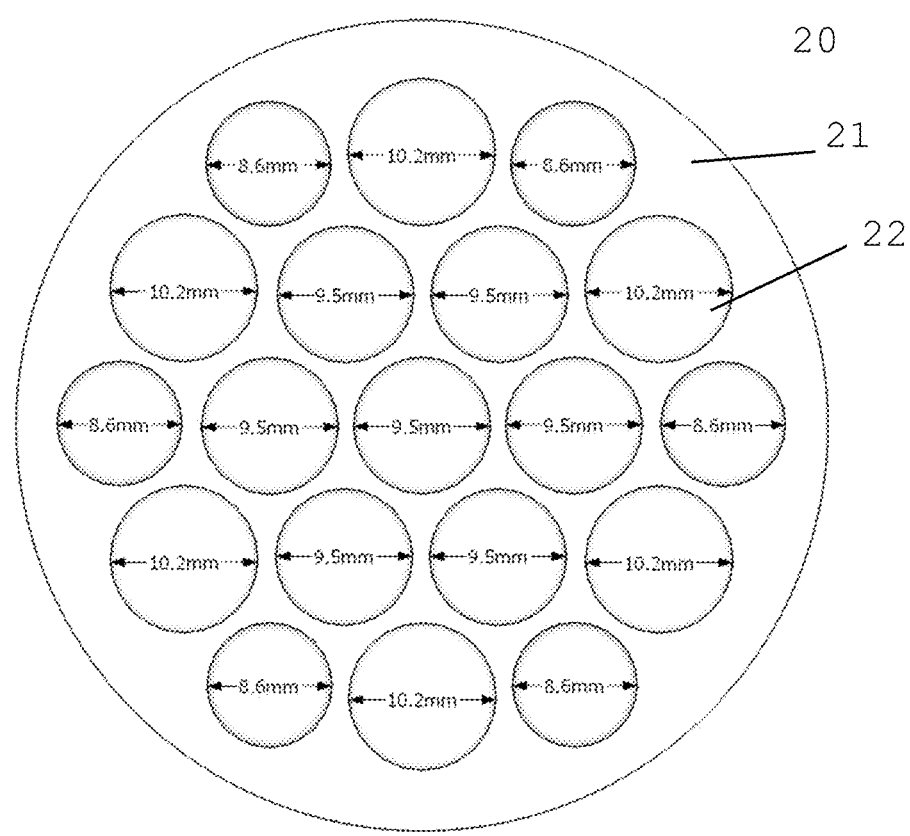
FIG. 56: Basic Molded Chocolate Wafer with Enlarged Wells, Plan View.
Figure 57:
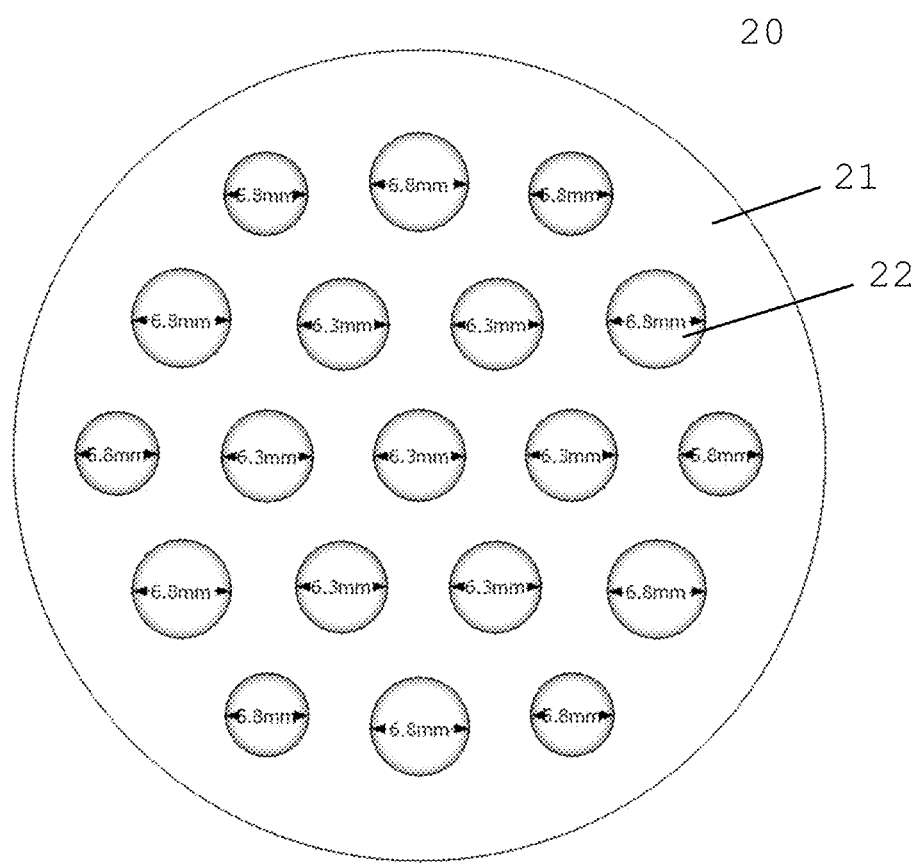
FIG. 57: Basic Molded Chocolate Wafer with Reduced Wells, Plan View.

Variant Well Diameters—The well diameter can be increased (FIG. 56) or decreased (FIG. 57) by a greater range than the diameter of the pearls of flavor 12 in a modified single shot deposition process. Values depicted in these figures are examples and it is contemplated that other diameters possible. Varying the well diameters will impact the Chocolate to Filling Ratio, as well as the structural properties of the wafer which in turn impacts mouth feel.

Variant Well Shapes—Well shape can be varied in a variety of ways. These variations can have an impact on Chocolate to Filling Ratio, esthetics and the efficacy of mold release.

Figure 58:
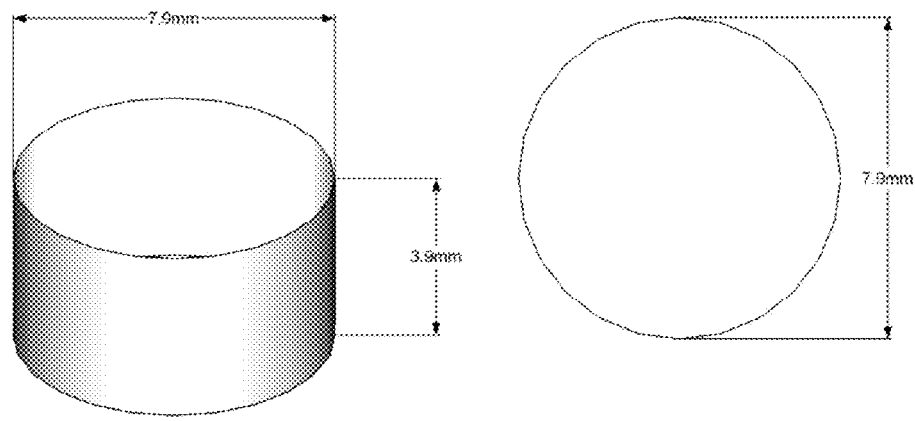
FIG. 58: Cylindrical Well, Isometric and Plan Views.
Figure 59:
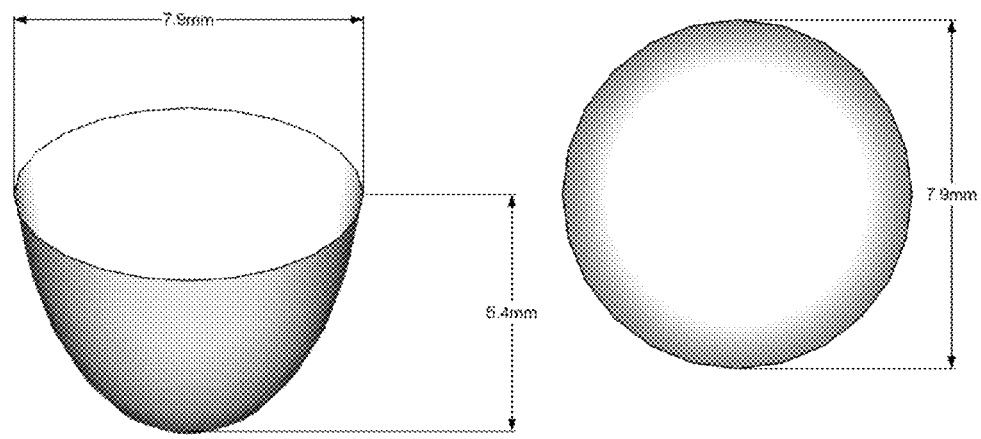
FIG. 59: Hemi-ellipsoidal Well, Isometric and Plan Views.
Figure 60:
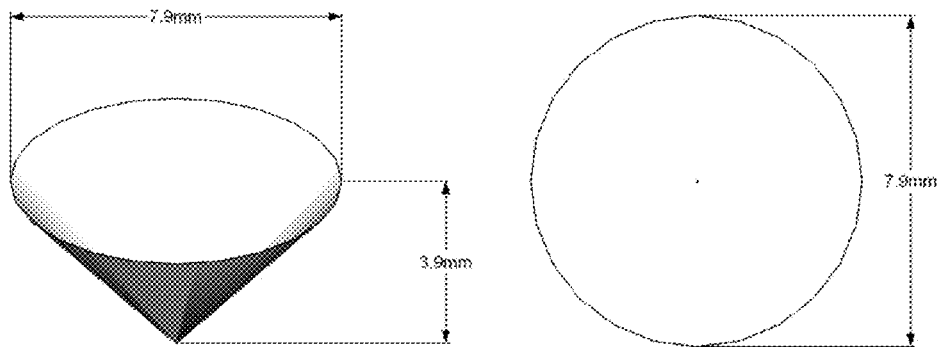
FIG. 60: Conical Well, Isometric and Plan Views.
Figure 61:
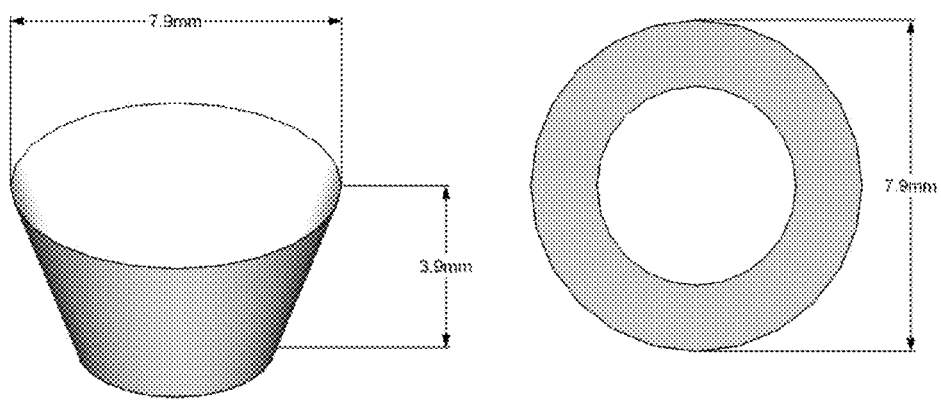
FIG. 61: Truncated Conical Well, Isometric and Plan Views.

The three stage basic product, previously described, features hemispheric wells, which have a circular plan (i.e. the opening at the top has a circular shape). Variations of a circular plan well may include cylindrical (FIG. 58), Hemi-ellipsoidal (FIG. 59), Conical (FIG. 60), and Truncated Conical (FIG. 61).

Figure 62:
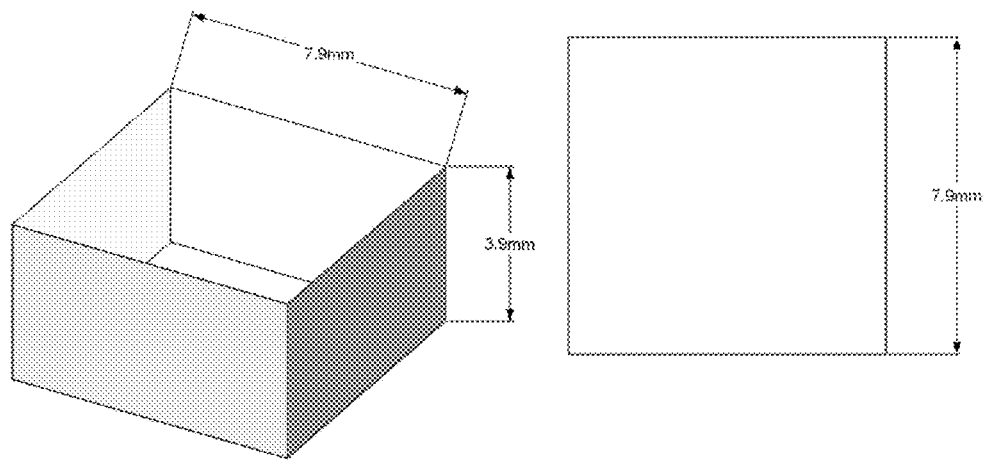
FIG. 62: Cuboidal Well, Parallel Projection and Plan Views.
Figure 63:
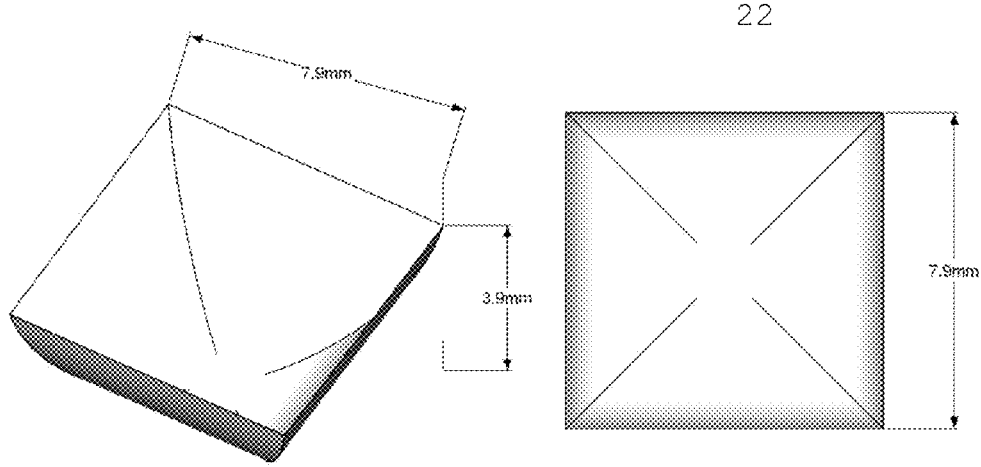
FIG. 63: Square Section Hemi-ellipsoidal Well, Parallel Projection and Plan Views.
Figure 64:
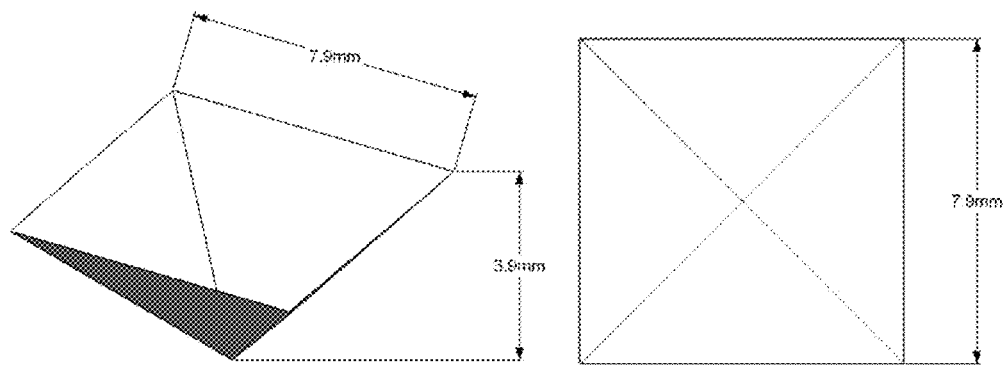
FIG. 64: Square Pyramidal Well, Parallel Projection and Plan Views.
Figure 65:
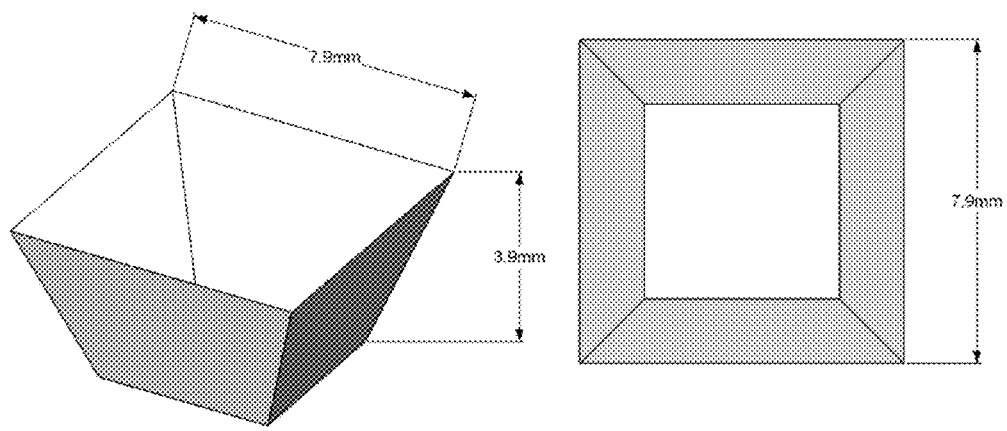
FIG. 65: Truncated Square Pyramidal Well, Parallel Projection and Plan Views.

Well shape can also be varied by changing the shape of the well plan. Examples of square plan wells include cuboidal (FIG. 62), square section hemi-ellipsoidal (FIG. 63), square pyramidal (FIG. 64) and truncated square pyramidal (FIG. 65).

Figure 66:
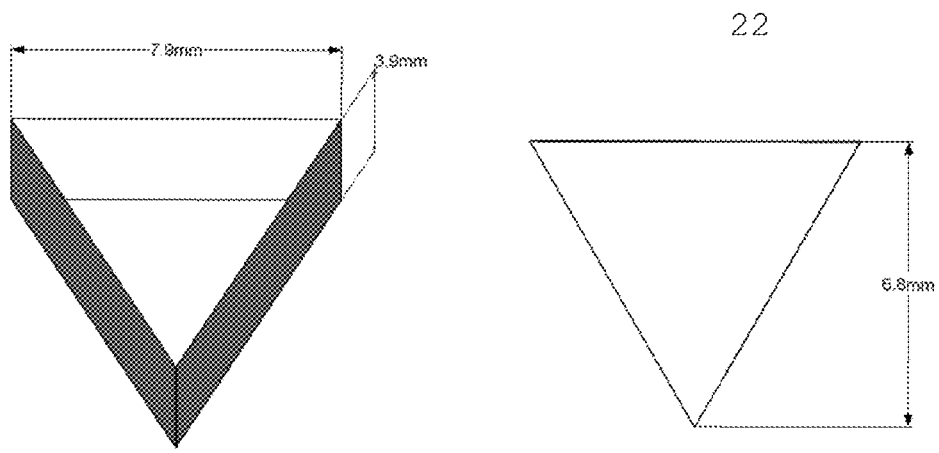
FIG. 66: Triangular Prismoidal Well, Isometric and Plan Views.
Figure 67:
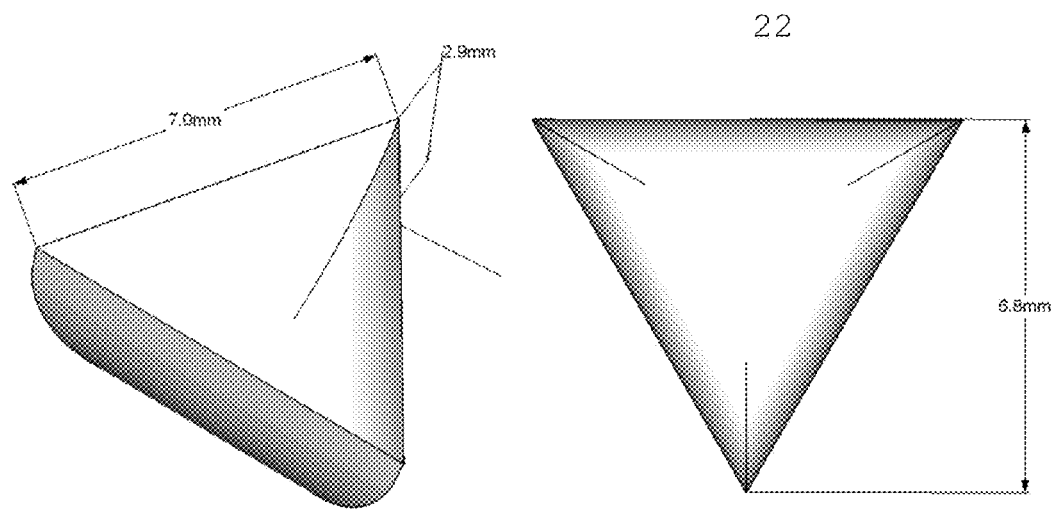
FIG. 67: Triangular Section Hemi-ellipsoidal Well, Parallel Projection and Plan Views.
Figure 68:
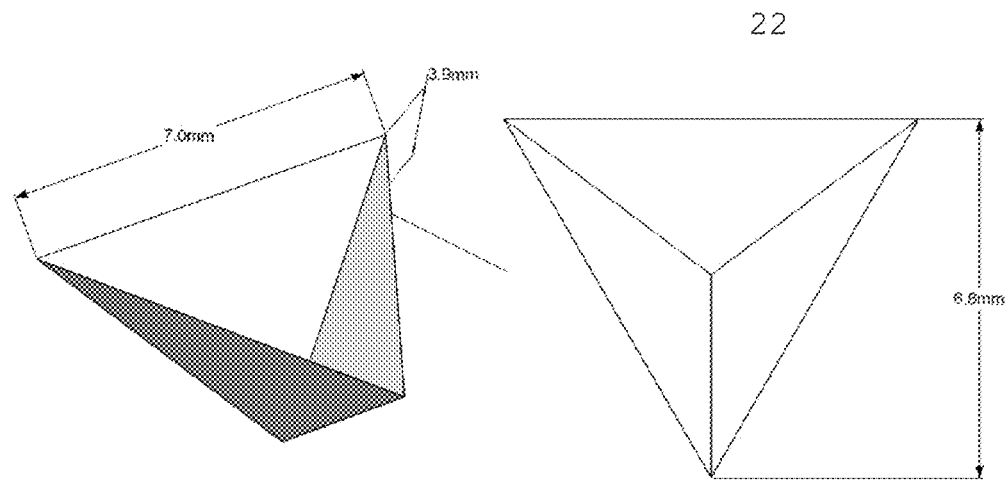
FIG. 68: Triangle Pyramidal Well, Parallel Projection and Plan Views.
Figure 69:
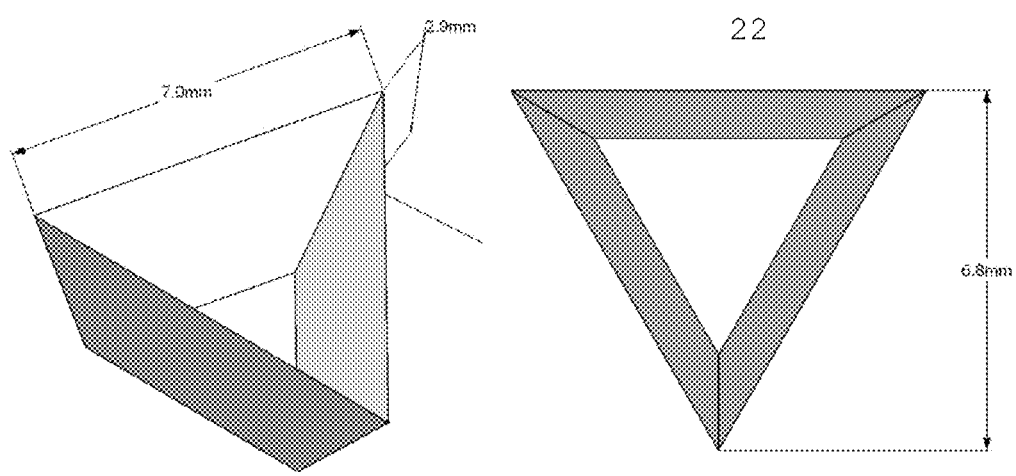
FIG. 69: Truncated Triangle Pyramidal Well, Parallel Projection and Plan Views.

Shape variations of triangle plan wells include triangular prismoidal (FIG. 66), triangular section Hemi-ellipsoidal (FIG. 67), triangle pyramidal (FIG. 68) and truncated triangle pyramidal (FIG. 69).

Figure 70:
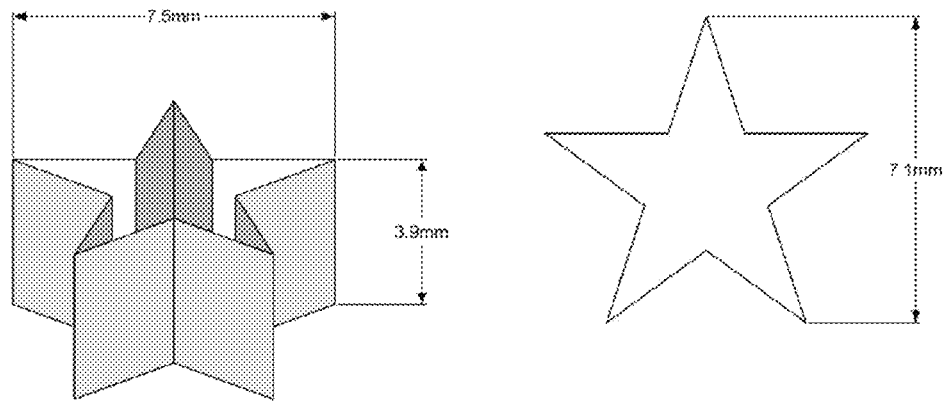
FIG. 70: Star Prismoidal Well, Isometric and Plan Views.
Figure 71:
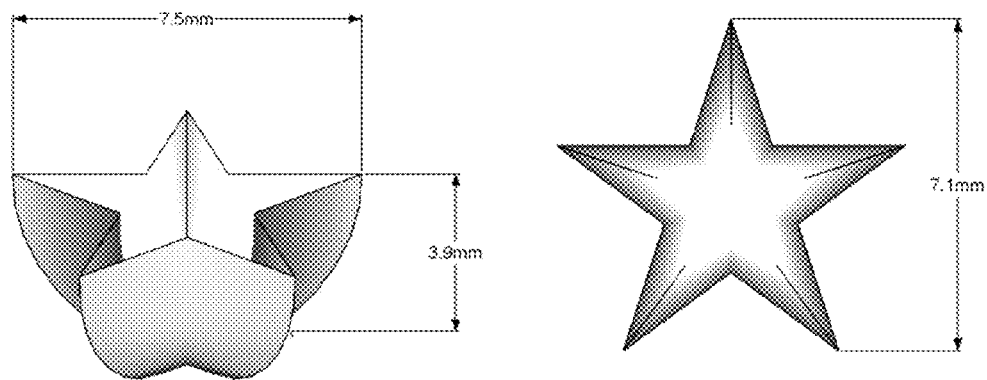
FIG. 71: Star Section Hemi-ellipsoidal Well, Isometric and Plan Views.
Figure 72:
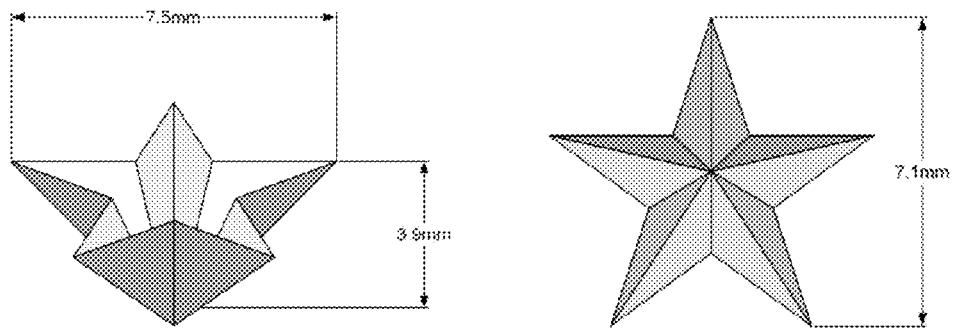
FIG. 72: Star Pyramidal Well, Isometric and Plan Views.
Figure 73:
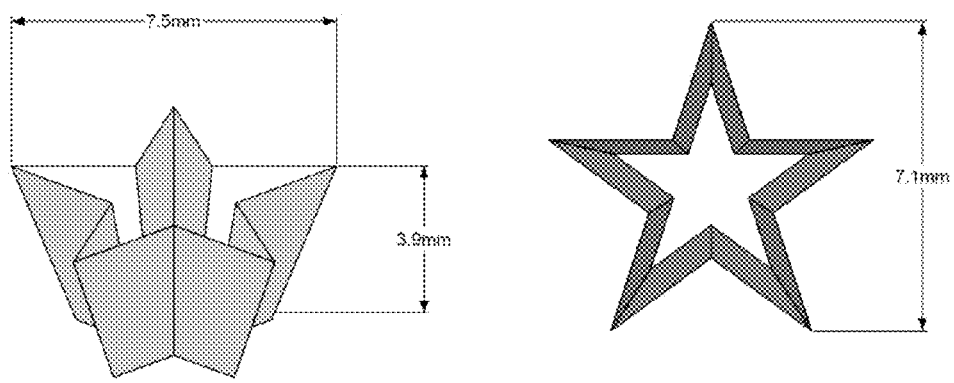
FIG. 73: Truncated Star Pyramidal Well, Isometric and Plan Views.

Well plan shapes can also included non-convex polygons, such as a five-pointed star (regular concave decagon). Examples include star prismoidal (FIG. 70), star section hemiellipsoidal (FIG. 71), star pyramidal (FIG. 72), and truncated star pyramidal (FIG. 73).

Combinations of Wafer Shape, Well Shape, and Tiling Pattern

The choice of which tiling pattern to use with a particular wafer plan shape is one consideration in product design. Likewise, the shape of the wells within the tiling pattern can also be varied.

Figure 74:
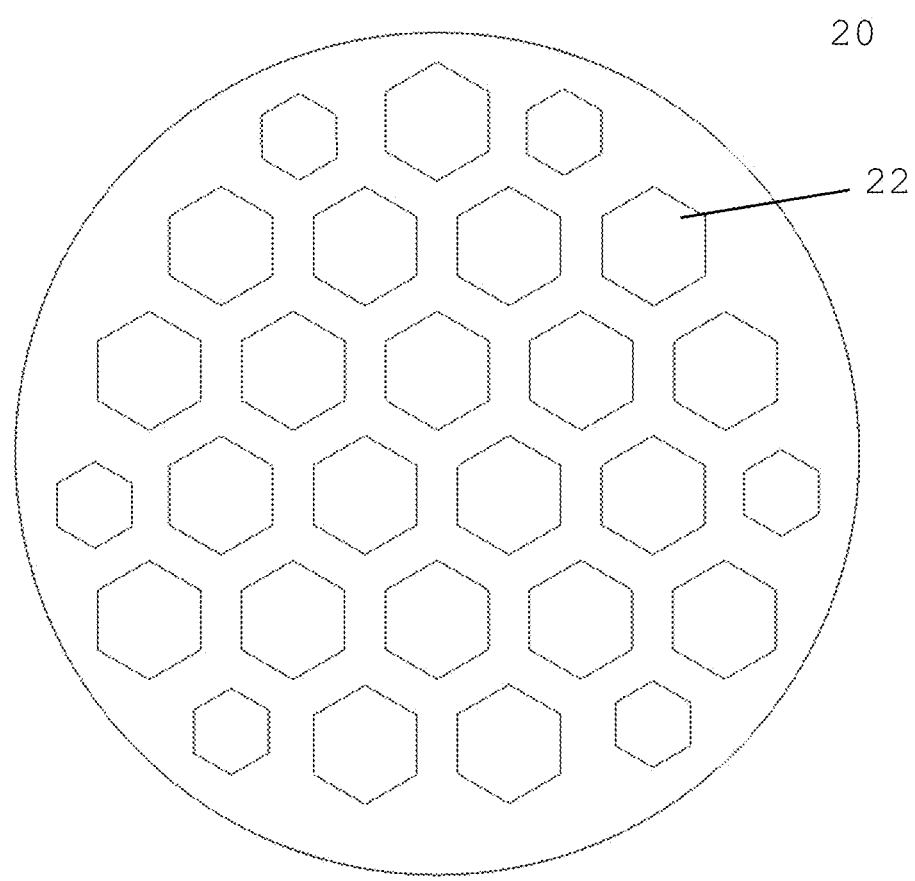
FIG. 74: Circular Wafer with 27 Hexagonal Wells, Plan View.
Figure 75:
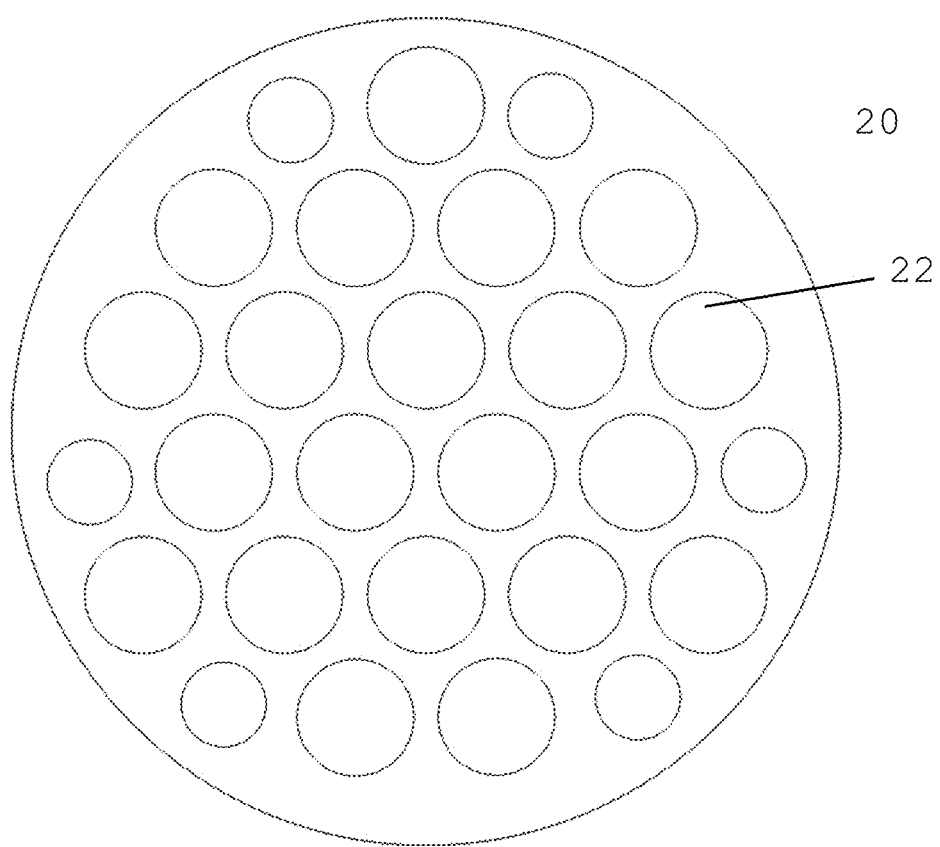
FIG. 75: Circular Wafer with 27 Circular Wells, Plan View.

Adjusting the wafer shape within a given tiling pattern can impact the structural properties of the wafer. FIG. 74 features hexagonal well shapes within the same tiling pattern as the circular well shapes reproduced in FIG. 75. The hexagonal wells 22 result in more uniform and thicker well walls, adding structural strength to the wafer.

The Modified single shot deposition produces filling cells with a circular plan. With the variant of well shapes made possible by the Three Stage Production Process, well shape and tiling pattern can be co-varied to increase well wall uniformity in wafers with non-circular plan shapes.

Figure 76:
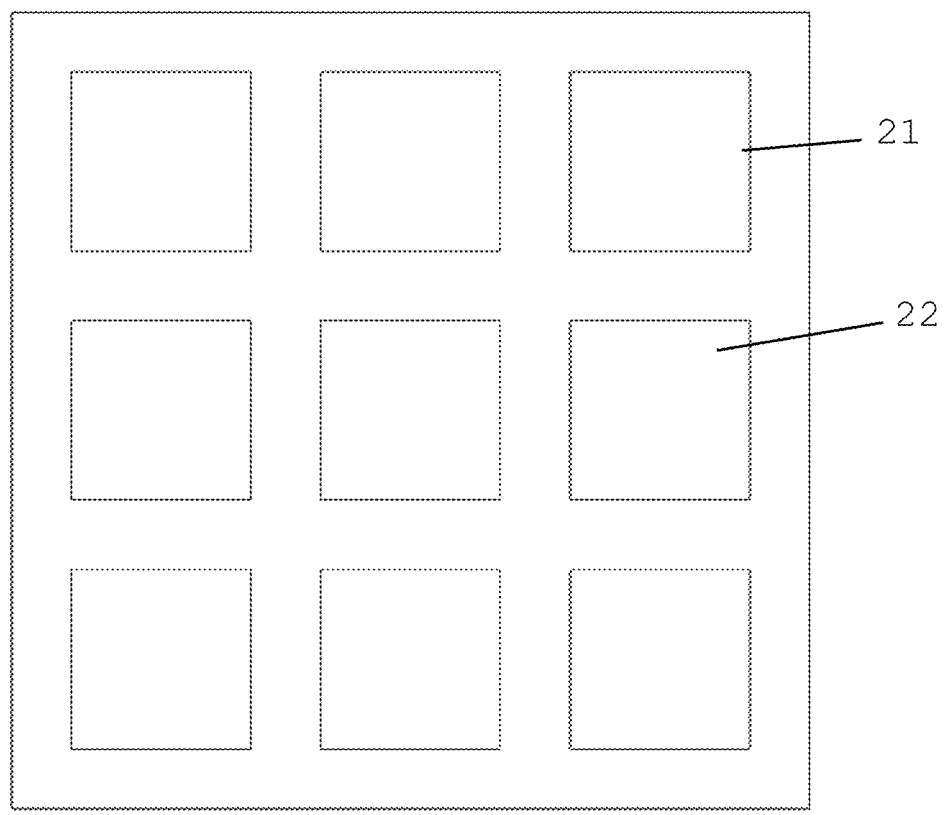
FIG. 76: Square Wafer with 9 Square Wells, Plan View.
Figure 77:
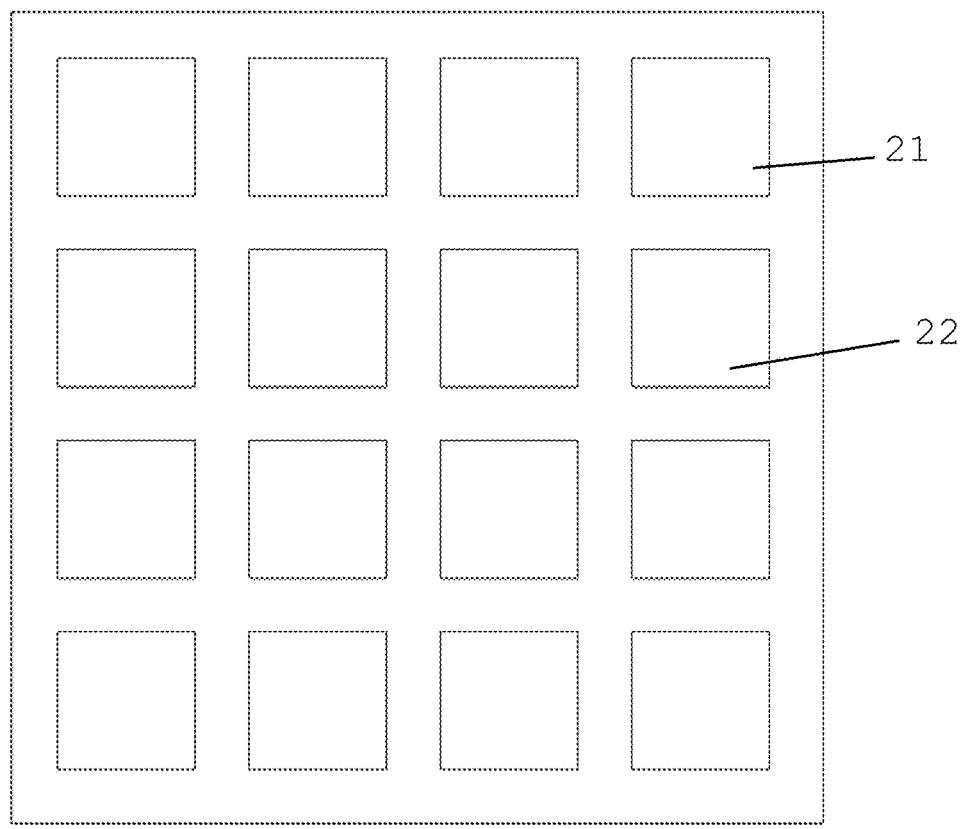
FIG. 77: Square Wafer with 16 Square Wells, Plan View.

FIG. 76 shows a square wafer 20 with an alternate tiling pattern, featuring square wells 22 arranged in a rectilinear grid. FIG. 77 shows a similar tiling pattern with smaller sized square wells 22 arranged a more densely packed rectilinear grid. This variation will result in a lower Chocolate to Filling Ratio for the same sized wafer than the tiling pattern featured in FIG. 76.

Figure 78:
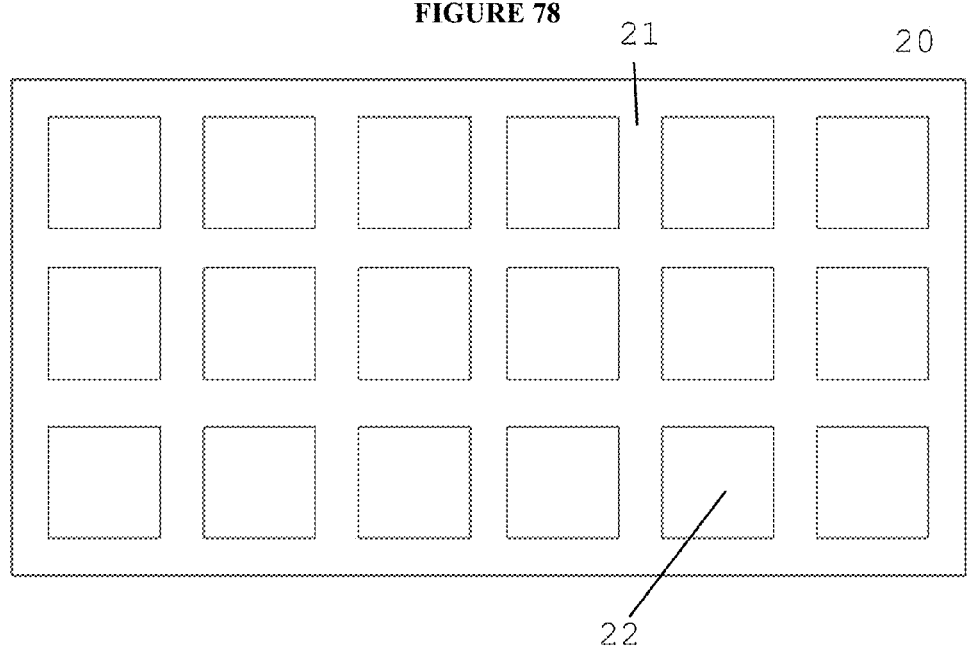
FIG. 78: Rectangular Wafer with 18 Square Wells, Plan View.
Figure 79:
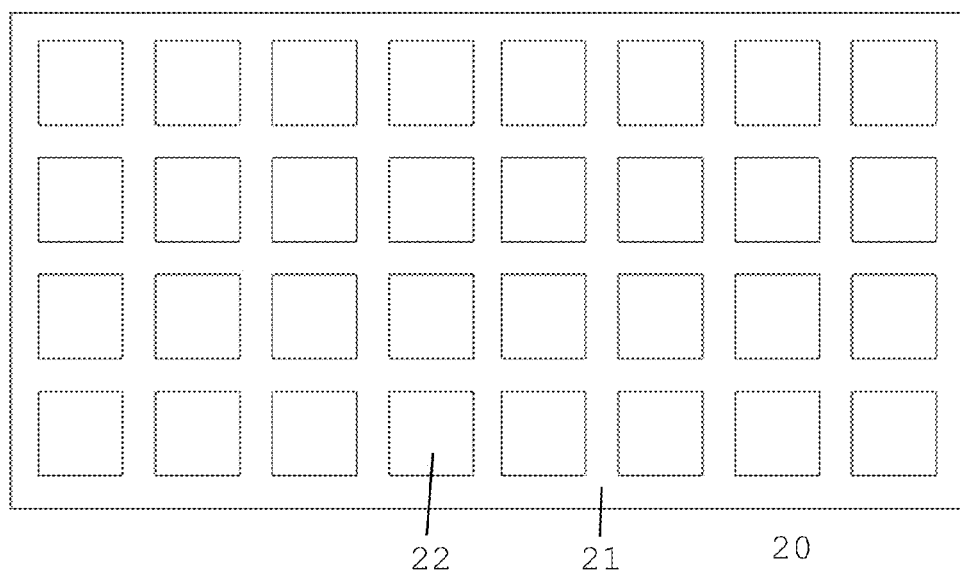
FIG. 79: Rectangular Wafer with 32 Square Wells, Plan View.

FIGS. 78 and 79 show similar variants of square cells 22 arranged in rectilinear grids within a rectangular wafer 20.

Figure 80:
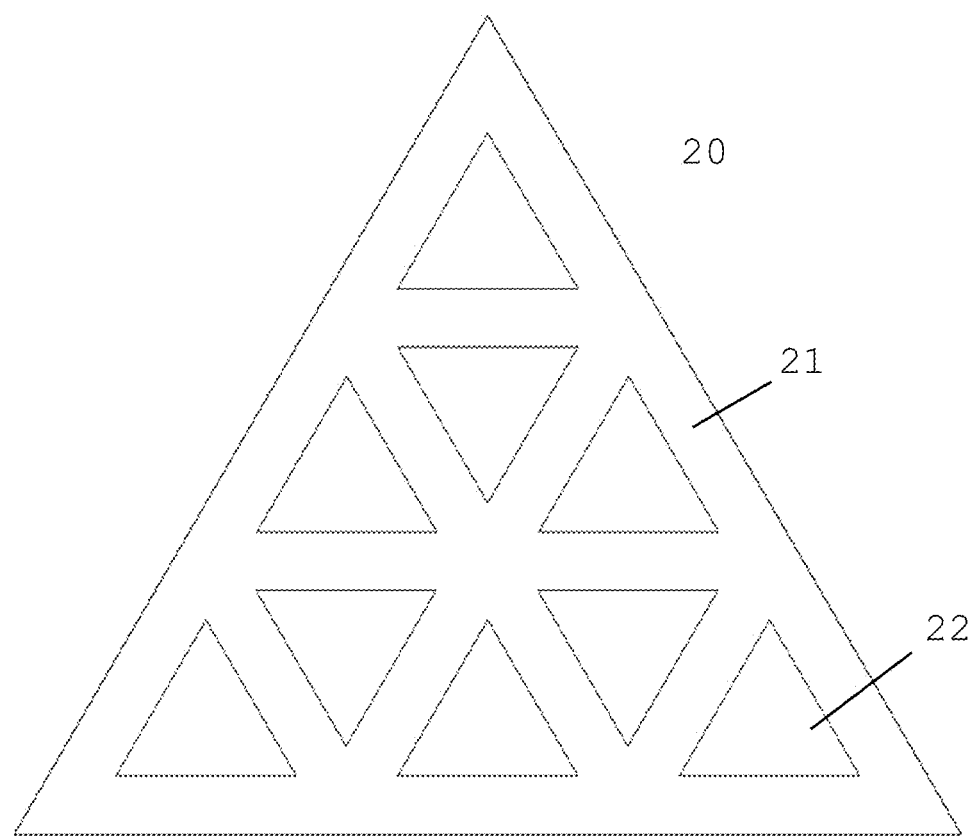
FIG. 80: Triangular Wafer with 9 Triangular Wells, Plan View.
Figure 81:
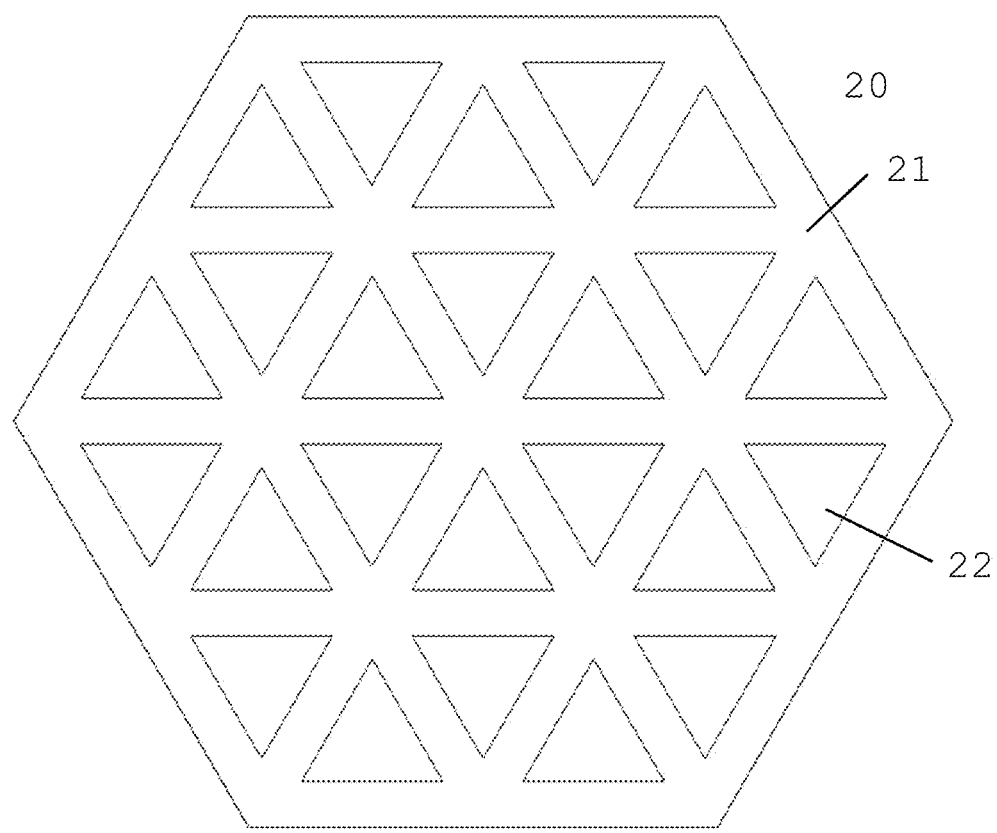
FIG. 81: Hexagonal Wafer with 24 Triangular Wells, Plan View.

FIG. 80 shows a triangular wafer 20 with triangular wells 22 arranged in a hexagonal grid. FIG. 81 shows a hexagonal wafer 20 with triangular wells 22 arranged in a hexagonal grid.

It should be understood that various changes, substitutions, additions and alterations can be made by one skilled in the art without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

The invention claimed is:

1. A method of making an edible chocolate confectionery, the steps comprising:
   heating chocolate to a tempered state and a flavored filling such that both are in a liquefied phase;
   depositing the tempered heated chocolate into a single mold cavity by extruding the heated chocolate through multiple jackets of a multi-nozzle jacketed tube assembly;
   extruding the heated flavored filling through multiple tubes of the multi-nozzle jacketed tube assembly, wherein two or more orbs of flavored filling are formed and are surrounded by the extruded heated tempered chocolate;

depositing the chocolate covered orbs of flavored filling into the single mold together with the tempered heated chocolate; and cooling the combination of chocolate and flavored filling until the chocolate is in a solid phase, wherein:

the heated tempered chocolate enters the single mold cavity through the multi-nozzle jacketed tube assembly prior to the heated flavored filling, subsequent to the start of the heated tempered chocolate entering the single mold cavity, liquefied or semi-liquefied flavored filling is extruded through the multi-nozzle jacketed tube assembly whereby the heated flavored filling is surrounded by the heated tempered chocolate, flow of the liquefied flavored filling is terminated prior to the termination of the chocolate flow such that the two or more orbs of flavored filling are formed within the heated tempered chocolate, and the heated tempered chocolate continues to flow into the single mold cavity until the single mold cavity is completely filled.

2. The method of manufacture according to claim 1, wherein the chocolate is one of white, milk or dark chocolate.

3. The method of manufacture according to claim 1, wherein the flavored filling is either a chocolate-based filling or a sugar-based filling.

4. The method of manufacture according to claim 3, wherein the sugar-based filling includes syrups and caramel.

5. The method of manufacture according to claim 1, wherein the two or more orbs of flavored filling are distributed throughout the chocolate confectionery.

6. The method of manufacture according to claim 1, wherein the flavored filling may remain in a semi-liquid or liquid phase after the heated tempered chocolate is cooled.

7. A method of making an edible chocolate confectionery, the steps comprising:

heating chocolate to a tempered state and a flavored filling such that both are in a liquefied phase;

depositing the heated tempered chocolate into a single mold cavity by depositing the heated tempered chocolate through multiple jackets of a multi-nozzle jacketed tube assembly;

subsequent to the start of the heated tempered chocolate entering the single mold cavity, the heated flavored filling is deposited with the heated tempered chocolate into the single mold cavity through multiple tubes of the multi-nozzle jacketed tube assembly, wherein as the heated flavored filling is surrounded by the heated tempered chocolate forming multiple orbs of flavored filling;

terminating the depositing of the flavored filling into the single mold cavity prior to terminating the flow of the heated tempered chocolate;

terminating the flow of heated tempered chocolate into the single mold cavity once the single mold cavity is completely filled; and cooling the combination of chocolate and flavored filling until the chocolate is in a solid phase.

8. The method of making an edible chocolate confectionery according to claim 7, wherein the chocolate is selected from white, milk or dark chocolate.

9. The method of making an edible chocolate confectionery according to claim 7, wherein the flavored filling is either a chocolate-based filling or a sugar-based filling.

10. The method of making an edible chocolate confectionery according to claim 9, wherein the sugar-based filling includes caramel.

11. The method of making an edible chocolate confectionery according to claim 7, wherein the multi-nozzle jacketed tube assembly consists of multiple plates having openings and channels, and wherein the heated tempered chocolate and flavored filling enter the multi-nozzle jacketed tube assembly through separate openings in an upper plate.

12. The method of making an edible chocolate confectionery according to claim 11, wherein the multiple tubes extend through the multiple plates, from the upper plate through a lower plate, and the multiple jackets extend through the lower plate such that each jacket of the multiple jackets surrounds one tube of the multiple tubes extending through the lower plate.

13. The method of making an edible chocolate confectionery according to claim 12, wherein the number of jackets and tubes in the multi-nozzle jacketed tube assembly correspond to the number of orbs of flavored filling in the edible chocolate confectionery.

14. The method of making an edible chocolate confectionery according to claim 7, wherein the heated tempered chocolate and flavored filling flow rate is maintained by temperature regulation of the multi-nozzle jacketed tube assembly and viscosity properties of the chocolate and flavored filling.

15. The method of making an edible chocolate confectionery according to claim 7, wherein multiple multi-nozzle jacketed tube assemblies and multiple single mold cavities are aligned to produce more than one edible chocolate confectioneries in a single deposition.

16. The method of making an edible chocolate confectionery according to claim 7, wherein the edible chocolate confectionary comprises multiple orbs of flavored filling suspended in a symmetrical pattern within the chocolate.

17. A method of making an edible chocolate confectionery, the steps comprising:

heating chocolate to a tempered state such that the chocolate is in a liquefied phase;

depositing the tempered heated chocolate into a single mold cavity by extruding the heated chocolate through multiple jackets of a multi-nozzle jacketed tube assembly;

depositing a liquid or semi-liquid flavored filling through multiple tubes of the multi-nozzle jacketed tube assembly into the deposited heated chocolate, wherein two or more orbs of flavored filling are formed and are surrounded by the deposited heated tempered chocolate; and cooling the combination of chocolate and flavored filling until the chocolate is in a solid phase, wherein:

the heated tempered chocolate enters the single mold cavity through the multi-nozzle jacketed tube assembly prior to the heated flavored filling, subsequent to the start of the heated tempered chocolate entering the single mold cavity, liquefied or semi-liquefied flavored filling exits the multiple tubes of the multi-nozzle jacketed tube assembly is surrounded by the heated tempered chocolate exiting the multiple jackets multi-nozzle jacketed tube assembly and then is deposited into the single mold cavity, flow of the liquefied flavored filling is terminated prior to the termination of the chocolate flow such that the two or more orbs of flavored filling are formed within the heated tempered chocolate, and the heated tempered chocolate continues to flow into the single mold cavity until the single mold cavity is completely filled.

* * * * *